(12) United States Patent
Kamada et al.

(10) Patent No.: US 10,604,698 B2
(45) Date of Patent: Mar. 31, 2020

(54) LIGHT UP-CONVERSION MATERIAL

(71) Applicant: NATIONAL INSTITUTE OF ADVANCED INDUSTRIAL SCIENCE AND TECHNOLOGY, Tokyo (JP)

(72) Inventors: Kenji Kamada, Osaka (JP); Kenji Kobayashi, Shizuoka (JP)

(73) Assignee: NATIONAL INSTITUTE OF ADVANCED INDUSTRIAL SCIENCE AND TECHNOLOGY (JP)

( * ) Notice: Subject to any disclaimer, the term of this patent is extended or adjusted under 35 U.S.C. 154(b) by 317 days.

(21) Appl. No.: 15/459,083

(22) Filed: Mar. 15, 2017

(65) Prior Publication Data
US 2017/0267922 A1 Sep. 21, 2017

(30) Foreign Application Priority Data

Mar. 18, 2016 (JP) .................................. 2016-055167
Mar. 3, 2017 (JP) .................................. 2017-040031

(51) Int. Cl.
*C09K 11/06* (2006.01)

(52) U.S. Cl.
CPC ...... *C09K 11/06* (2013.01); *C09K 2211/1007* (2013.01); *C09K 2211/1011* (2013.01); *C09K 2211/1014* (2013.01)

(58) Field of Classification Search
CPC .................. C09K 1/06; C09K 2211/10; C09K 2211/1011; C09K 2211/1014; C07D 321/00; C07D 493/08
See application file for complete search history.

(56) References Cited

U.S. PATENT DOCUMENTS

| 9,890,326 B2* | 2/2018 | Kamada ............... C07D 493/08 |
| 2008/0103279 A1 | 5/2008 | Heun et al. |
| 2016/0053168 A1 | 2/2016 | Kamada et al. |

FOREIGN PATENT DOCUMENTS

| JP | 2008506798 A | 3/2008 |
| WO | 2014136619 A1 | 9/2014 |
| WO | WO 2014/136619 * | 9/2014 |

OTHER PUBLICATIONS

Ceroni, "Energy up-conversion by low-power excitation: new applications of an old concept," Chemistry a European Journal, vol. 17, pp. 9560-9564. (2011).
Trupke, et al., "Efficiency enhancement of solar cells by luminescent up-conversion of sunlight," Solar Energy Materials and Solar Cells, vol. 90, pp. 3327-3338. (2006).
Monguzzi, et al., "Low power, non-coherent sensitized photon up-conversion: modelling and perspectives," Phys. Chem. Chem. Phys., vol. 14, pp. 4322-4332. (2012).

* cited by examiner

*Primary Examiner* — C Melissa Koslow
(74) *Attorney, Agent, or Firm* — McDonalds Hopkins LLC

(57) ABSTRACT

The present invention relates to an organic light up-conversion material in a solid state that realizes high light up-conversion efficiency.

4 Claims, 3 Drawing Sheets

LIGHT UP-CONVERSION MATERIAL

TECHNICAL FIELD

The present invention relates to a light up-conversion material.

BACKGROUND ART

In the related art, light up-conversion luminescent substances that convert long-wavelength light to short-wavelength light are known. As the light up-conversion luminescent substances, inorganic light up-conversion luminescent substances in which a rare-earth element or the like is used are known. The inorganic light up-conversion luminescent substances have been applied, for example, to IR cards that convert infrared laser light to visible light, and have already been brought into practical use.

On the other hand, in organic light up-conversion luminescent substances in which an organic compound is used, it is known that an intense and broad absorption spectrum of the organic compound is used to enable light up-conversion with broader wavelengths and lower incident power compared with the inorganic light up-conversion luminescent substances. An example of application of the organic light up-conversion luminescent substances includes organic solar cells. In an organic solar cell, those generating free charge carriers from solar light are ultraviolet light and blue light. Hence, it is expected to improve photoelectric conversion efficiency of the organic solar cell by using an organic light up-conversion luminescent substance in the organic solar cell to convert long-wavelength light such as green and red light into short-wavelength light such as blue light. Thus, the organic light up-conversion luminescent substances are receiving attentions in recent years (see, Patent Document 1, Non-Patent Documents 1 and 2, for example).

The organic light up-conversion luminescent substance is generally used together with a photosensitizer, and is used as an organic light up-conversion material. An example of a mechanism of light up-conversion in a currently known organic light up-conversion material includes the following mechanism. First, a photosensitizer molecule ($^1$A) in its ground state absorbs light energy to transit to an excited singlet state ($^1$A*) ($^1$A+hv→$^1$A*). Next, intersystem crossing to an excited triplet state ($^3$A*) rapidly occurs ($^1$A*→$^3$A*), and energy is transferred from the photosensitizer molecule in the excited triplet state to a luminescent molecule. As a result, the photosensitizer molecule loses the energy to return into its ground state. On the other hand, a luminescent molecule ($^1$E) in its ground state changes into an excited triplet ($^3$E*) (triplet-triplet energy transfer: $^3$A*+$^1$E→$^1$A+$^3$E*). When the concentration of luminescent molecules having changed into the excited triplet state increases, interaction between the luminescent molecules having changed into the excited triplet state occurs more efficiently, and energy transfers from the one luminescent molecule having changed into the excited triplet state to the other luminescent molecule. At this time, the one luminescent molecule having changed into the excited triplet state returns to the ground state, and the other changes into an excited singlet state (triplet-triplet annihilation process: $^3$E*+$^3$E*→$^1$E+$^1$E*). Then, up-converted light ($^1$E*→$^1$E+hv$_f$) is emitted as fluorescence from the luminescent molecule having changed into the excited singlet state. Such a mechanism is called "triplet-triplet annihilation up-conversion", "photochemical up-conversion" and so on.

Considering such a mechanism, in the organic light up-conversion material, it is necessary for the energy of the excited triplet state of the luminescent substance to be about half of the energy of the excited singlet state. For this reason, as the luminescent substance, for example a molecule having an aromatic ring backbone is used. Moreover, as the photosensitizer, for example an organic metal complex that produces an excited triplet state with high efficiency is used.

For example, as a light up-conversion luminescent substance in a blue light emitting region, anthracene, 9,10-diphenyl anthracene and the like are known. However, light up-conversion efficiency (conversion efficiency from long-wavelength light to short-wavelength light) using such a luminescent substance is as low as about 3 to 5%, and development of a novel organic light up-conversion material having higher light up-conversion efficiency is demanded.

Moreover, many of conventional organic light up-conversion materials are liquids, as described below, and from the viewpoint of practical use, the development of solid organic light up-conversion materials is also demanded.

PRIOR ART DOCUMENTS

Patent Documents

Patent Document 1: Japanese Translation of PCT Application No. 2008-506798
Patent Document 2: WO 2014/136619

Non-Patent Documents

Non-Patent Document 1: Ceroni, P., Energy up-conversion by low-power excitation: new applications of an old concept. Chemistry (Weinheim an der Bergstrasse, Germany) 2011, 17, 9560-4.
Non-Patent Document 2: Trupke, T.; Shalav, a.; Richards, B. S.; Wurfel, P.; Green, M., Efficiency enhancement of solar cells by luminescent up-conversion of sunlight. Solar Energy Materials and Solar Cells 2006, 90, 3327-3338.

SUMMARY OF THE INVENTION

Problems to be Solved by the Invention

In an organic light up-conversion material, because of its operation principles, a molecular collision between the sensitizer and the luminescent substance or between molecules of the luminescent substance in the triplet state is required for energy transfer between the sensitizer and the luminescent substance and for pair annihilation between the molecules of the luminescent substance in the triplet state. Hence, high-efficiency materials with a luminescence quantum yield over 10% have been conventionally either liquids or gel media substantially containing liquids, and thus, have had difficulty in handling or device manufacturing.

Moreover, it is known that when an organic light up-conversion material in the form of a solid not containing a liquid is produced using a vapor deposition method or a spin-coating method from a solution, the sensitizer and the luminescent substance are each separately crystallized (for example, the article "Monguzzi, A.; Tubino, R.; Hoseinkhani, S.; Campione, M.; Meinardi, F., Low power, non-coherent sensitized photon up-conversion: modelling and perspectives. Phys. Chem. Chem. Phys. 2012, 14, 4322-4332"), which markedly inhibits the energy transfer between the sensitizer and the luminescent substance.

Further, because the energy transfer between the sensitizer and the luminescent substance and the molecules of the luminescent substance in the triplet state are inhibited by oxygen in the air, it has been necessary to seal them in an inert gas to remove oxygen. The foregoing is also true for the conventional technology (Patent Document 2) by the present inventors.

Under such circumstances, it is a primary object of the present invention to provide an organic light up-conversion material in a solid state that realizes high light up-conversion efficiency.

Means for Solving the Problem

To overcome the problem of the separate crystallization of each of the sensitizer and the luminescent substance during solidification by evaporation of the solvent from the solution, the present inventors arrived at the idea that the luminescent substance may be crystallized earlier than the crystallization of molecules of the sensitizer, to allow the sensitizer in an uncrystallized state to be incorporated into the luminescent substance and solidified. Thus, the present inventors studied diligently to solve the above-described problem, by rapidly crystallizing the luminescent substance, by reducing the concentration of the sensitizer relative to the luminescent substance and increasing the concentration of the luminescent substance, and by adjusting the solvent and evaporation conditions. As a result, it was found that a light up-conversion material having a very high light up-conversion efficiency can be obtained by using a compound represented by the above general formula (1) as a light up-conversion luminescent substance, and solidifying the compound together with a photosensitizer. The present invention was accomplished by further study based on such a finding.

That is, the present invention provides the following aspects.

Item 1. A light up-conversion material containing a compound represented by the following general formula (1) and a photosensitizer, the light up-conversion material being a solid:

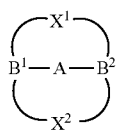

(1)

[In general formula (1), group A represents a bivalent moiety of a polycyclic aromatic compound with 3 to 5 condensed rings optionally having a substituent.

Group $B^1$ and group $B^2$ each independently represent a trivalent group represented by the following general formula (2a) or (2b):

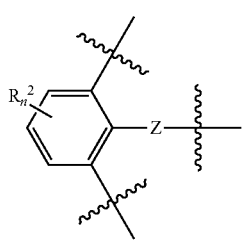

(2a)

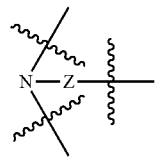

(2b)

[In each of general formulas (2a) and (2b), group Z binds to group A, remaining two binding hands respectively bind to group $X^1$ and group $X^2$, and group Z represents a single bond, $R_n^2$ is 0 to 3 substituents which substitute for a hydrogen atom on a benzene ring, and each independently represent an alkyl group, an alkoxy group, a phenyl group, a hydroxyl group, or an amino group.]

Group $X^1$ and group $X^2$ each independently represent a straight-chain or branched-chain alkylene group with a carbon number of two or more, optionally having at least one bond selected from the group consisting of an ether bond, an ester bond, an amide bond, and a sulfide bond.].

Item 2. The light up-conversion material according to Item 1, wherein a total proportion of the compound represented by general formula (1) and the photosensitizer in the solid is 60 mass % or more.

Item 3. The light up-conversion material according to Item 1 or 2, containing a crystal formed by the compound represented by general formula (1) and the photosensitizer.

Item 4. The light up-conversion material according to any one of Items 1 to 3, wherein in general formula (1), group A is any one of polycyclic aromatic compound moieties represented by the following general formulas (A1) to (A23):

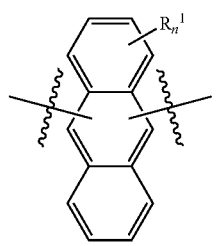

(A1)

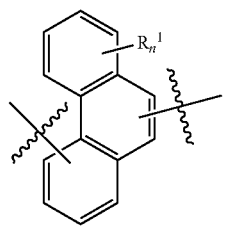

(A2)

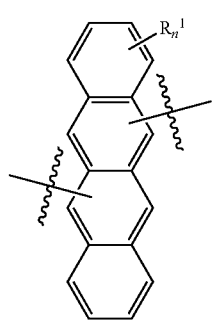

(A3)

-continued
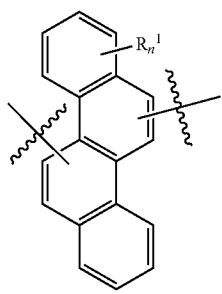
(A4)
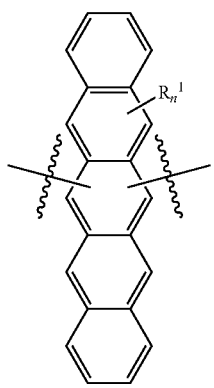
(A5)
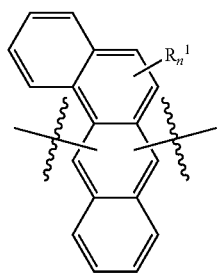
(A6)
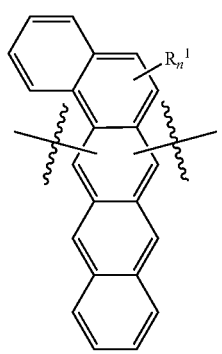
(A7)
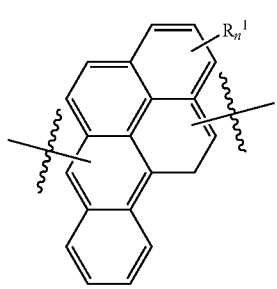
(A8)
-continued
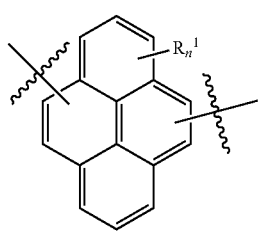
(A9)
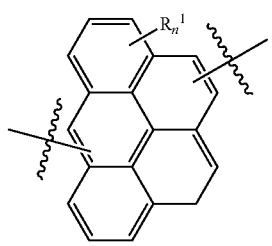
(A10)
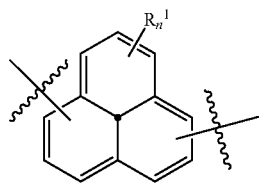
(A11)
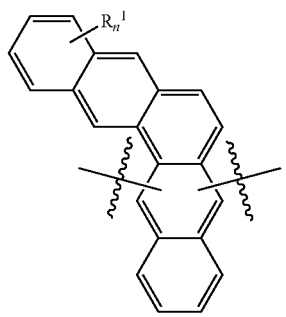
(A12)
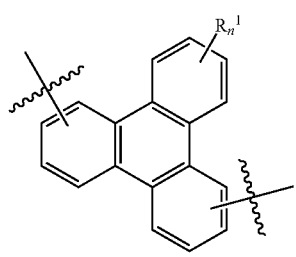
(A13)
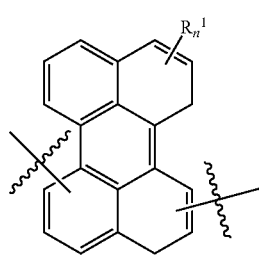
(A14)

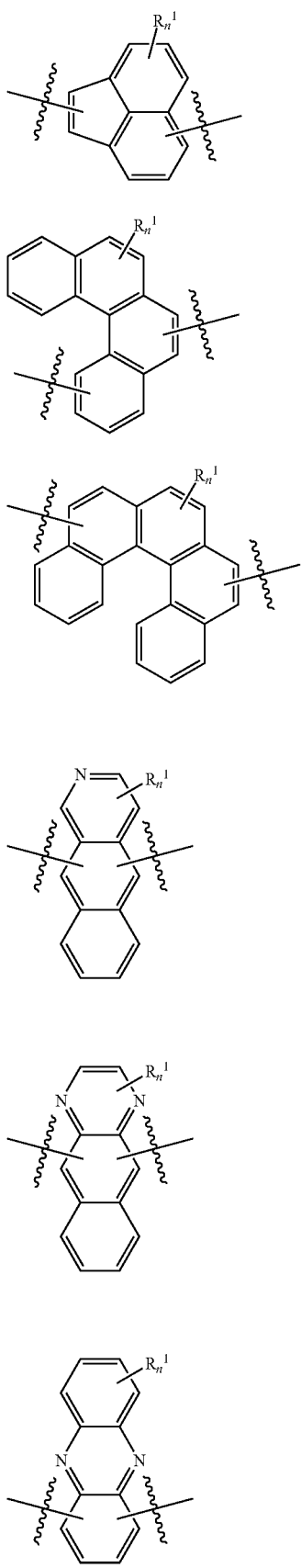

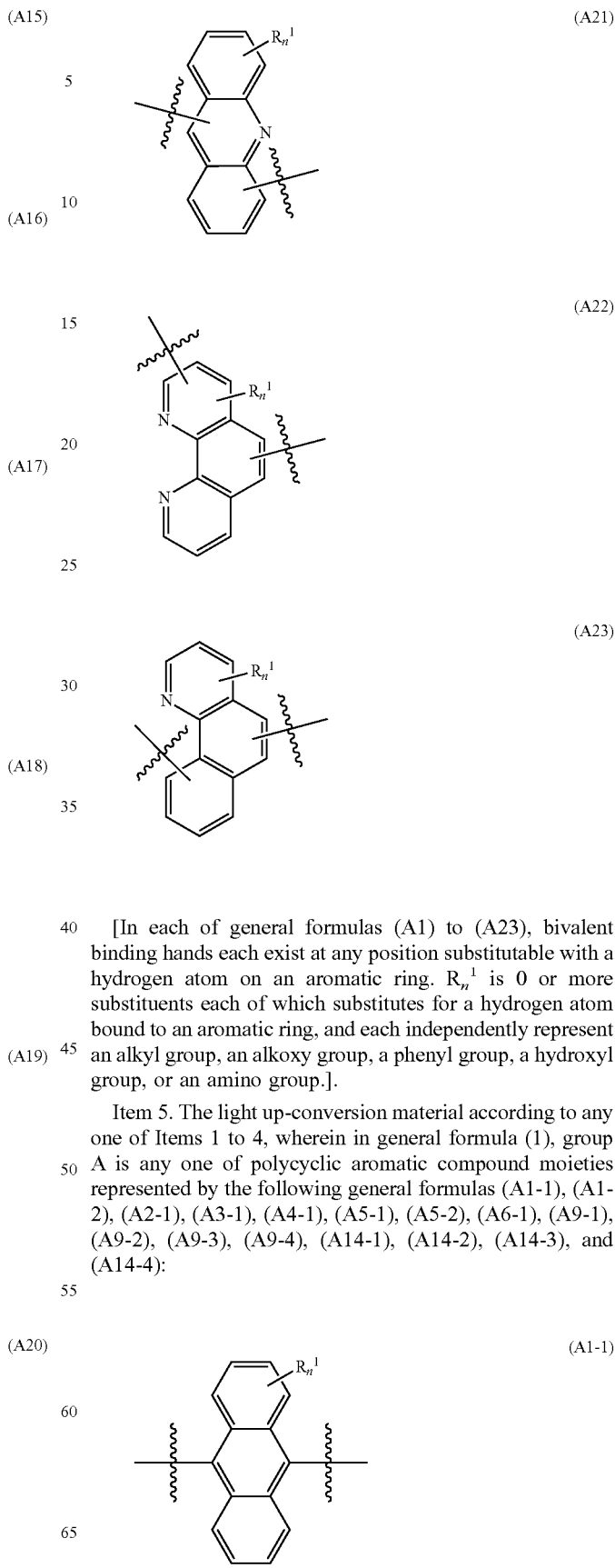

[In each of general formulas (A1) to (A23), bivalent binding hands each exist at any position substitutable with a hydrogen atom on an aromatic ring. $R_n^1$ is 0 or more substituents each of which substitutes for a hydrogen atom bound to an aromatic ring, and each independently represent an alkyl group, an alkoxy group, a phenyl group, a hydroxyl group, or an amino group.].

Item 5. The light up-conversion material according to any one of Items 1 to 4, wherein in general formula (1), group A is any one of polycyclic aromatic compound moieties represented by the following general formulas (A1-1), (A1-2), (A2-1), (A3-1), (A4-1), (A5-1), (A5-2), (A6-1), (A9-1), (A9-2), (A9-3), (A9-4), (A14-1), (A14-2), (A14-3), and (A14-4):

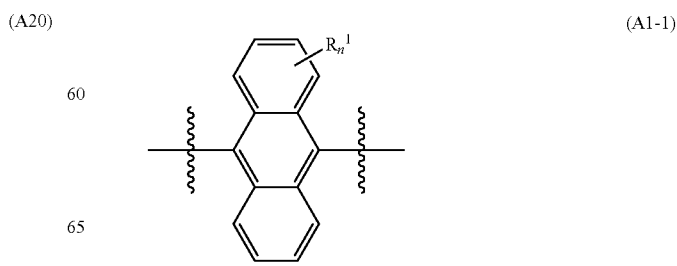

-continued
(A1-2)
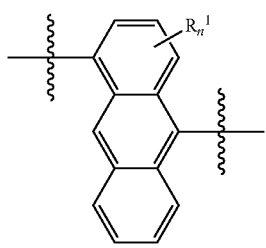
(A2-1)
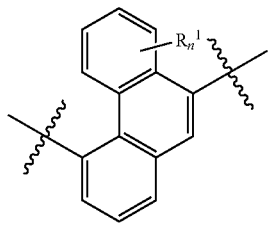
(A3-1)
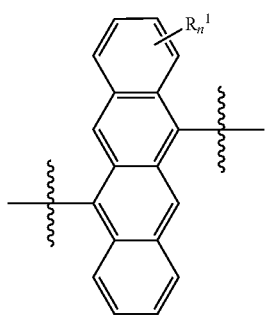
(A4-1)
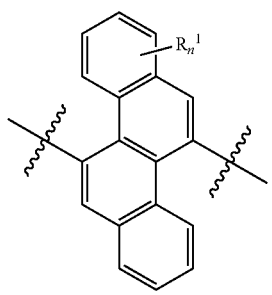
(A5-1)
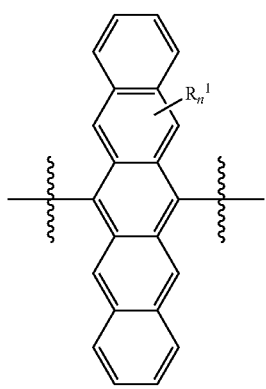
(A5-2)
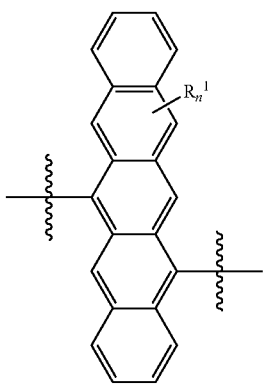
(A6-1)
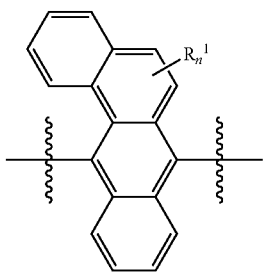
(A9-1)
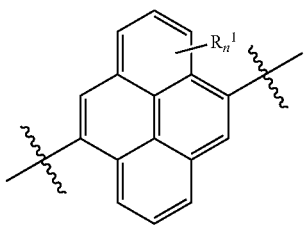
(A9-2)
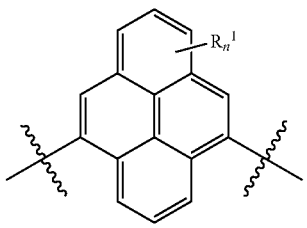
(A9-3)
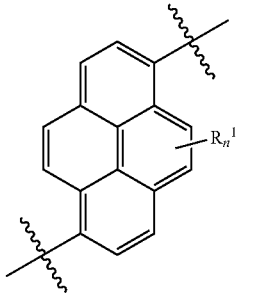

-continued

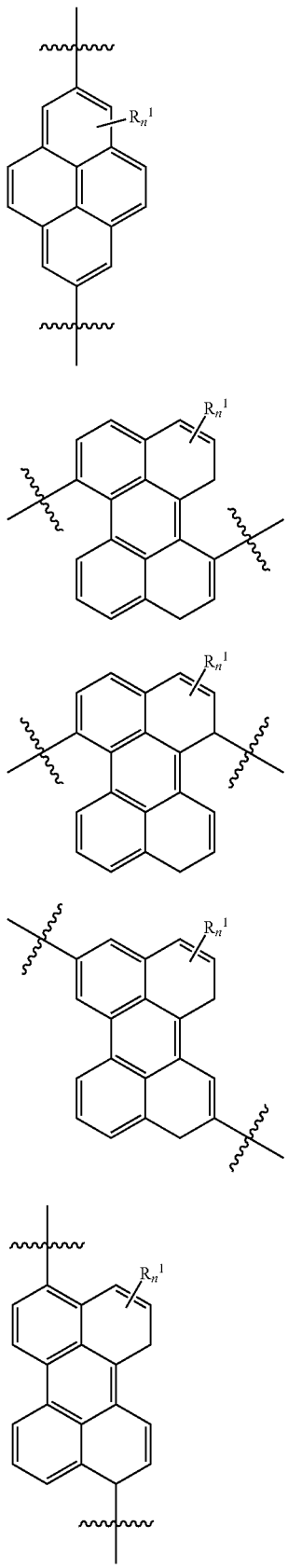

(A9-4)

(A14-1)

(A14-2)

(A14-3)

(A14-4)

[In each of general formulas (A1-1), (A1-2), (A2-1), (A3-1), (A4-1), (A5-1), (A5-2), (A6-1), (A9-1), (A9-2), (A9-3), (A9-4), (A14-1), (A14-2), (A14-3), and (A14-4), $R_n^1$ is the same as specified with regard to $R_n^1$ defined above with respect to general formulas (A1) to (A23).].

Item 6. The light up-conversion material according to any one of Items 1 to 5, wherein group $B^1$ and group $B^2$ each independently represent any one of trivalent groups represented by the following general formulas (3a-1) to (3a-4):

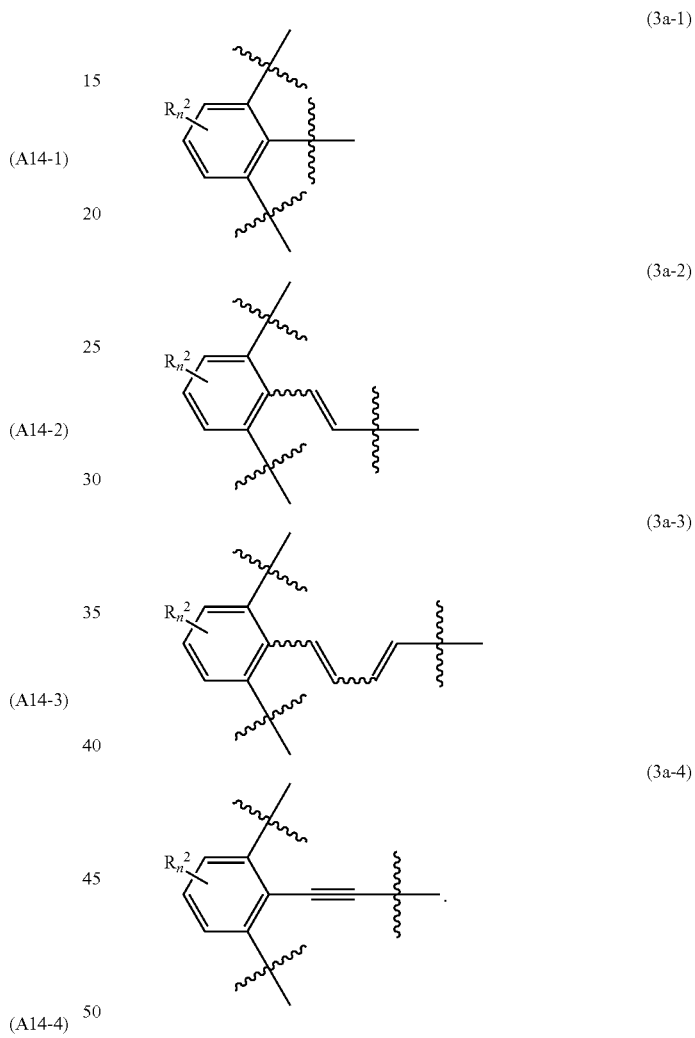

[In each of general formulas (3a-1) to (3a-4), $R_n^2$ is the same as specific with regard to $R_n^2$ defined above with respect to general formula (2a).].

Item 7. The light up-conversion material according to any one of Items 1 to 6, wherein in general formula (1), group $X^1$ and group $X^2$ each independently represent a straight-chain alkylene group with a carbon number of 5 to 10, optionally having at least one bond selected from the group consisting of an ether bond, an ester bond, an amide bond, and a sulfide bond.

Item 8. A method of converting a light wavelength, including irradiating the light up-conversion material according to any one of Items 1 to 7 with light to cause emission of light having a wavelength shorter than a wavelength of radiated light.

Item 9. A method of producing a light up-conversion material including the step of drying a solution containing a compound represented by the following general formula (1) and a photosensitizer:

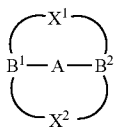
(1)

[In general formula (1), group A represents a bivalent moiety of a polycyclic aromatic compound with 3 to 5 condensed rings optionally having a substituent.

Group $B^1$ and group $B^2$ each independently represent a trivalent group represented by the following general formula (2a) or (2b):

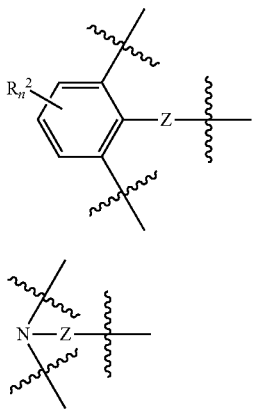

[In each of general formulas (2a) and (2b), group Z binds to group A, remaining two binding hands respectively bind to group $X^1$ and group $X^2$, and group Z represents a single bond, $R_n^2$ is 0 to 3 substituents which substitute for a hydrogen atom on a benzene ring, and each independently represent an alkyl group, an alkoxy group, a phenyl group, a hydroxyl group, or an amino group.]

Group $X^1$ and group $X^2$ each independently represent a straight-chain or branched-chain alkylene group with a carbon number of two or more, optionally having at least one bond selected from the group consisting of an ether bond, an ester bond, an amide bond, and a sulfide bond.].

Advantages of the Invention

According to the present invention, there is provided a light up-conversion luminescent material in a solid state that realizes high light up-conversion efficiency.

EMBODIMENTS OF THE INVENTION

Figure 1:
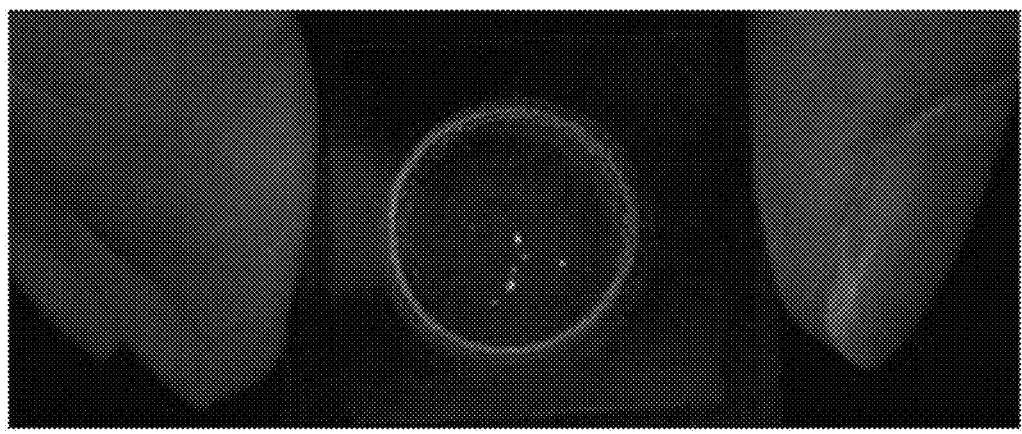
FIG. 1 is a photograph of the solid sample obtained in Example 1, wherein the solid sample was irradiated with a laser beam having an optical output power of 4 mW, and having its beam diameter enlarged with a convex lens, to cause the solid spread in circular form to be excited, and the solid sample was visually observed through a notch filter for preventing scattering of the radiated light.

The light up-conversion material of the present invention contains a compound represented by the following general formula (1) and a photosensitizer, and is a solid.

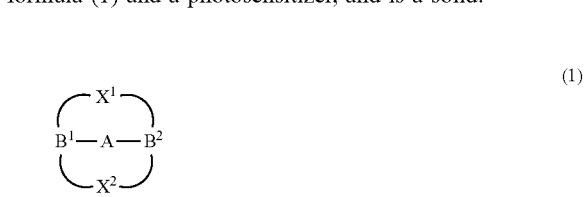
(1)

Here, the compound represented by general formula (1) is a compound that functions as a light up-conversion luminescent substance in the light up-conversion material of the present invention. In the present invention, the "light up-conversion luminescent substance" means a compound that emits light having a wavelength shorter than that of absorbed light. In the light up-conversion material of the present invention, the photosensitizer functions as an acceptor, and the light up-conversion luminescent substance functions as a donor. Hereinafter, the light up-conversion luminescent material of the present invention will be described in detail.

[Light Up-Conversion Luminescent Substance]

The light up-conversion luminescent substance is a compound represented by the above general formula (1), and has a function of emitting light having a wavelength shorter than that of light absorbed by the light up-conversion material of the present invention. In general formula (1), group A binds to group $B^1$ and group $B^2$. Moreover, group $B^1$, group $X^1$, group $B^2$, and group $X^2$ bind in this order to form a ring, and group A is positioned in this ring.

In general formula (1), group A represents a bivalent moiety of a polycyclic aromatic compound with 3 to 5 condensed rings optionally having a substituent. Examples of the aromatic ring constituting group A include a benzene ring, a cyclopentadienyl ring, a pyridine ring, a pyrazine ring, a pyrimidine ring, a pyridazine ring, a furan ring, a thiophene ring and a silole ring.

Specific examples of group A include polycyclic aromatic compound moieties represented by the following general formulas (A1) to (A23):
(A1)
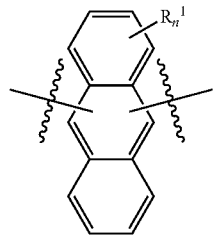
(A2)
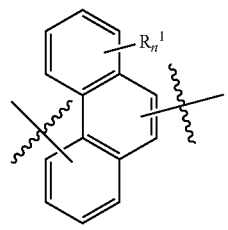
(A3)
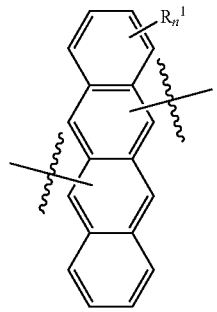
(A4)
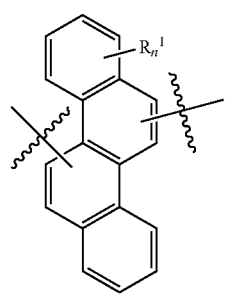
(A5)
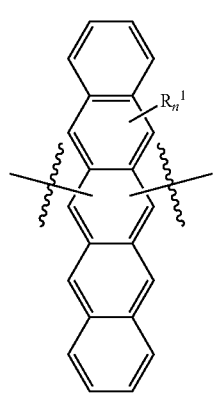
(A6)
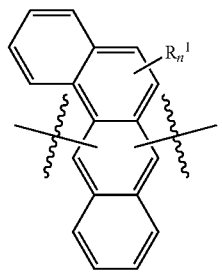
(A7)
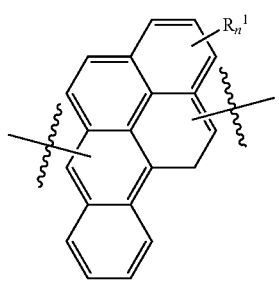
(A8)
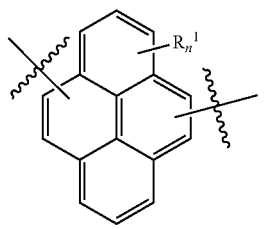
(A9)
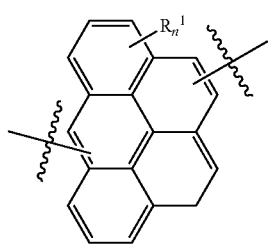
(A10)
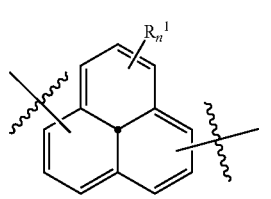
(A11)

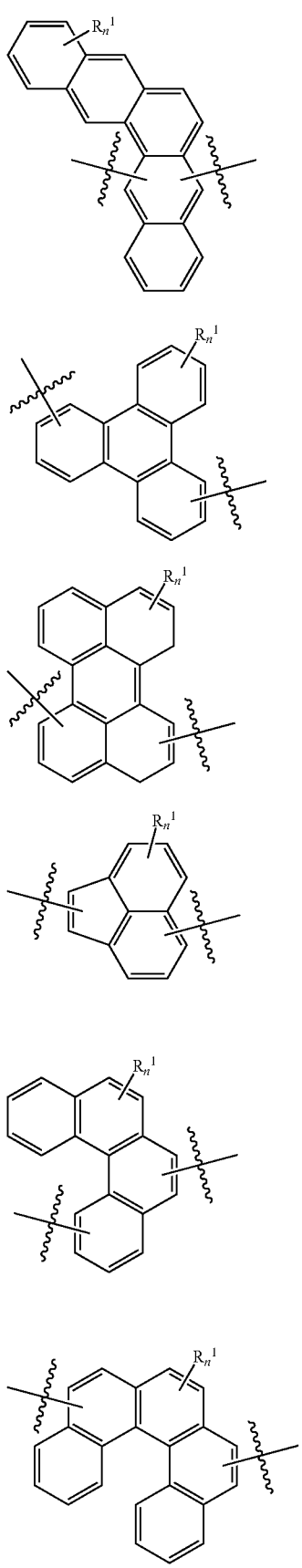
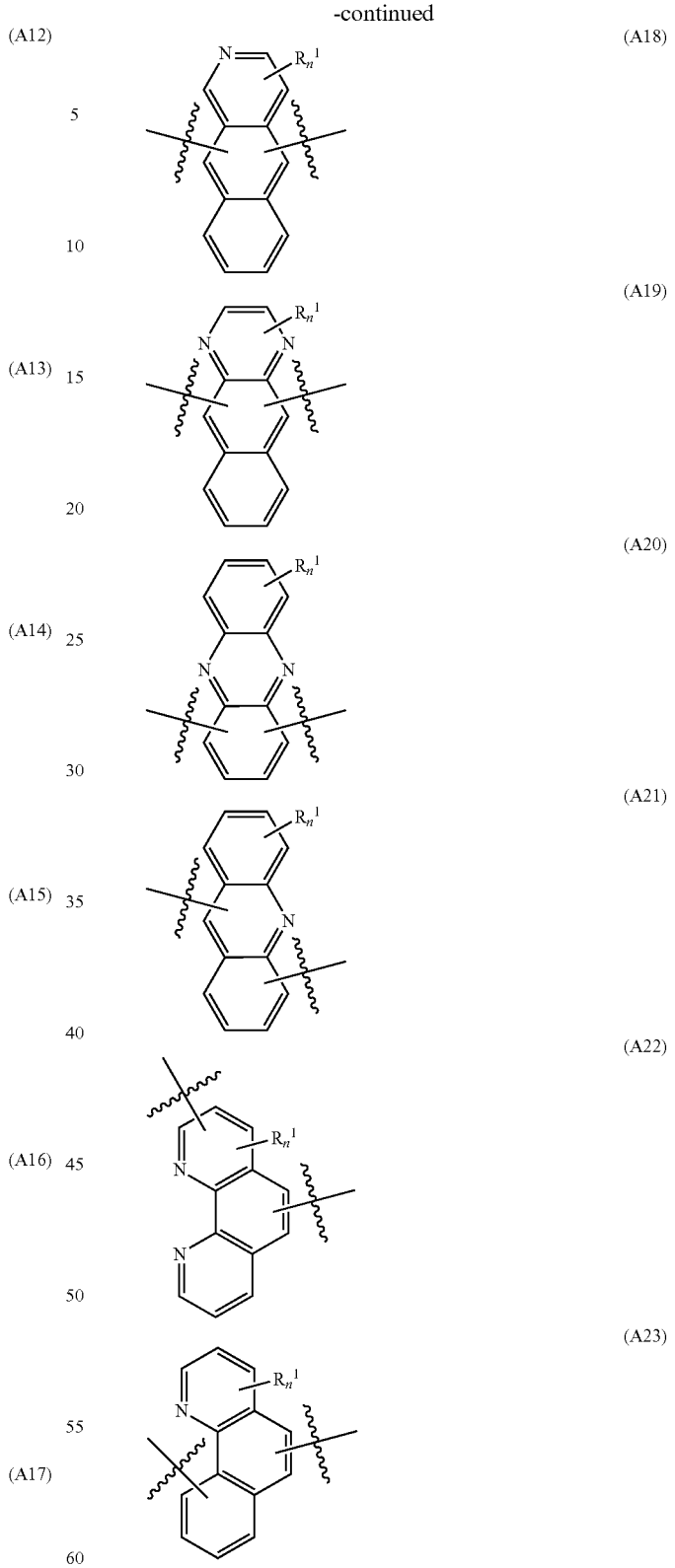
In each of general formulas (A1) to (A23), the positions of bivalent binding hands are not particularly limited, and the bivalent binding hands each exist at any position substitutable with a hydrogen atom on an aromatic ring. The bivalent binding hands preferably each exist on the same aromatic ring or on aromatic rings adjacent to each other. As a result, it can be considered that the size of the ring can be reduced, interaction between molecules of the luminescent substance becomes likely occur, and it becomes possible to further improve the light up-conversion efficiency. Moreover, the bivalent binding hands preferably each exist at a position where a radical is likely to be generated when no binding hand exists. Existence of each binding hand at such a position inhibits generation of a radical at such a position, and suppresses decrease in the light up-conversion efficiency due to formation of a dimer resulting from radical reaction between molecules of the luminescent substance.

In each of general formulas (A1) to (A23), $R_n^1$ is zero or more substituents each of which substitutes for a hydrogen atom bound to an aromatic ring. Although an upper limit of the number of $R_n^1$ differs depending on the number of hydrogen atoms bound to the aromatic ring in each of general formulas (A1) to (A23), the upper limit is typically about 0 to 8, preferably about 0 to 4. Zero or more $R_n^1$ each independently represent an alkyl group, an alkoxy group, a phenyl group, a hydroxyl group, or an amino group. When $R_n^1$ is an alkyl group or an alkoxy group, the carbon number is not particularly limited, but from the view point of reducing the steric hindrance of group A and facilitating interaction between molecules of the luminescent substance, the carbon number includes preferably about 1 to 10.

In general formula (1), examples of preferred group A include polycyclic aromatic compound moieties represented by the following general formulas (A1-1), (A1-2), (A2-1), (A3-1), (A4-1), (A5-1), (A5-2), (A6-1), (A9-1), (A9-2), (A9-3), (A9-4), (A14-1), (A14-2), (A14-3), and (A14-4). As a result of such a structure of group A, the luminescent substance has a structure in which a ring formed by group $B^1$, group $X^1$, group $B^2$, and group $X^2$ surrounds group A in a center part of group A. It can be considered that interaction becomes likely to occur between molecules of a luminescent substance having such a structure, and it becomes possible to further improve the light up-conversion efficiency. Moreover, the two binding hands of group A having such a structure are each positioned on a carbon atom where a radical is likely to be generated when no binding hand exists. That is, in such a structure, the two binding hands of group A inhibit generation of a radical at such a position. This can be considered to effectively suppress decrease in the light up-conversion efficiency due to formation of a dimer resulting from radical reaction between molecules of the luminescent substance.

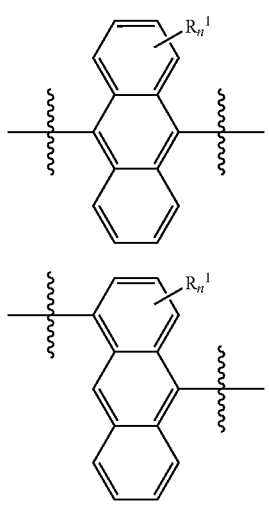

(A1-1)

(A1-2)

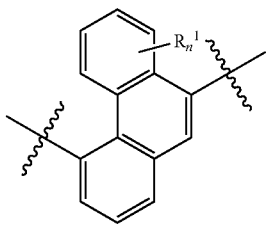

(A2-1)

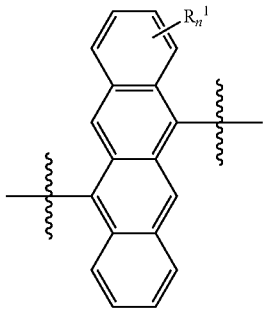

(A3-1)

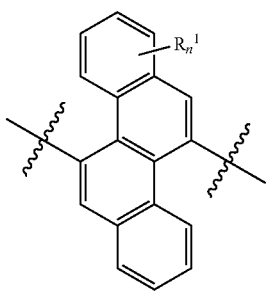

(A4-1)

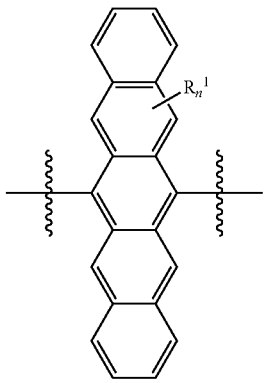

(A5-1)

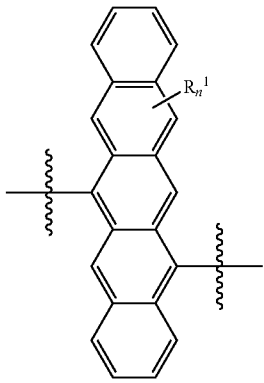

(A5-2)

-continued
(A6-1)
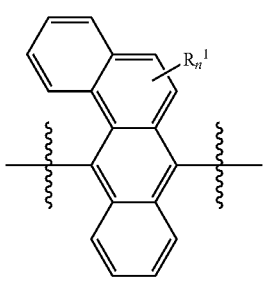
(A9-1)
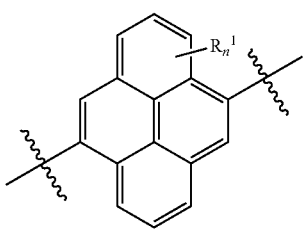
(A9-2)
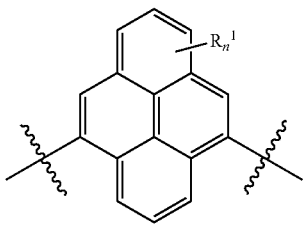
(A9-3)
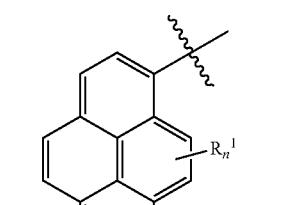
(A9-4)
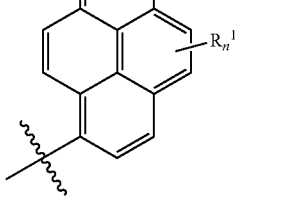
-continued
(A14-1)
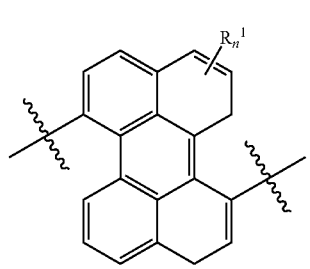
(A14-2)
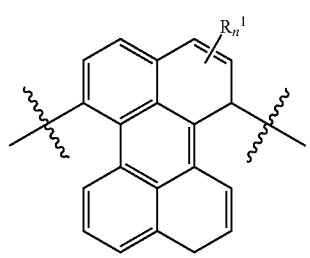
(A14-3)
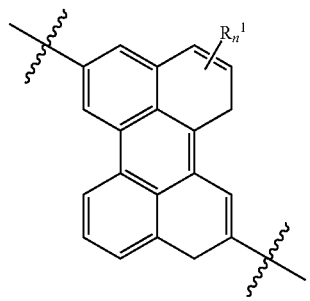
(A14-4)
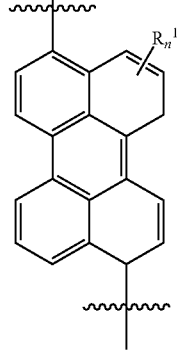
In each of general formulas (A1-1), (A1-2), (A2-1), (A3-1), (A4-1), (A5-1), (A5-2), (A6-1), (A9-1), (A9-2), (A9-3), (A9-4), (A14-1), (A14-2), (A14-3), and (A14-4), $R_n^1$ is the same as specific with regard to $R_n^1$ defined above with respect to general formulas (A1) to (A23).

In general formula (1), group $B^1$ and group $B^2$ each independently represent a trivalent group represented by the following general formula (2a) or (2b):

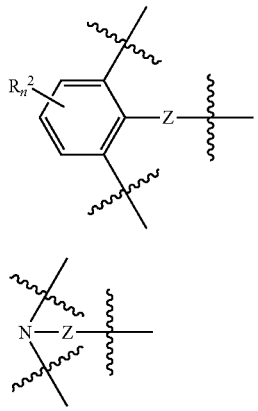

(2a)

(2b)

In each of general formulas (2a) and (2b), group Z binds to each of the two binding hands of group A. Moreover, remaining two binding hands in each of general formulas (2a) and (2b) respectively bind to group $X^1$ and group $X^2$ in general formula (1).

In each of general formulas (2a) and (2b), group Z represents a single bond. Moreover, in general formula (2a), $R_n^2$ is 0 to 3 substituents which each substitute for a hydrogen atom on a benzene ring, and each independently represent an alkyl group, an alkoxy group, a phenyl group, a hydroxyl group, or an amino group. When $R_n^2$ is an alkyl group or an alkoxy group, the carbon number is not particularly limited, but from the view point of reducing the steric hindrance of group $B^1$ and group $B^2$ and facilitating interaction between molecules of the luminescent substance, and simultaneously increasing the compatibility with the sensitizer, the carbon number preferably includes about 1 to 10, and more preferably about 5 to 10.

Specific examples of group $B^1$ and group $B^2$ each independently include trivalent groups represented by the following general formulas (3a-1) to (3a-4):

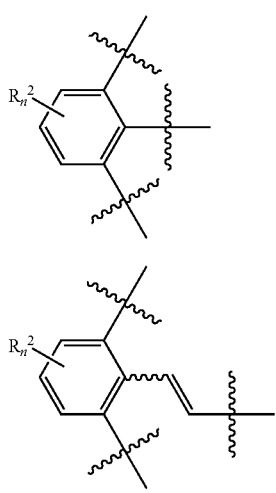

(3a-1)

(3a-2)

-continued

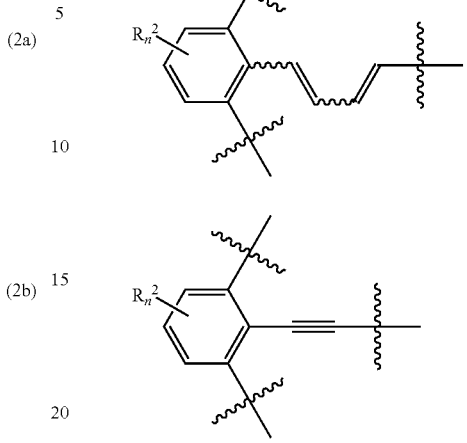

(3a-3)

(3a-4)

$R_n^2$ in each of general formulas (3a-1) to (3a-4) is the same as $R_n^2$ in each of the above general formulas (2a) and (2b).

In general formula (1), one of bivalent binding hands of each of group $X^1$ and group $X^2$ binds to group $B^1$, and the other binding hand binds to group $B^2$. Group $X^1$ and group $X^2$ are each independently a straight-chain or branched-chain alkylene group with a carbon number of two or more, optionally having at least one bond selected from the group consisting of an ether bond, an ester bond, an amide bond, and a sulfide bond. From the view point of reducing the steric hindrance of group $X^1$ and group $X^2$ and facilitating interaction between molecules of the luminescent substance, group $X^1$ and group $X^2$ each include preferably a straight-chain alkylene group with a carbon number of 5 to 10, optionally having at least one bond selected from the group consisting of an ether bond, an ester bond, an amide bond, and a sulfide bond, more preferably a straight-chain alkylene group with a carbon number of 5 to 10 or a straight-chain alkylene group with a carbon number of 5 to 10 having an ether bond.

Particularly preferred as the compound represented by general formula (1) are the compounds represented by the following general formulas (1a-1) to (1a-3), (1b-1) to (1b-3), and (1c-1) to (1c-3):

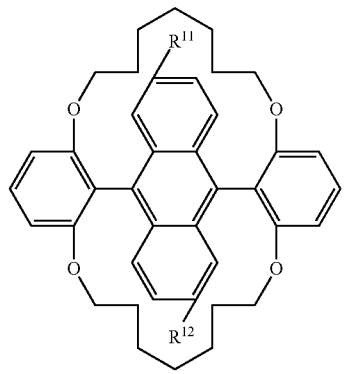

(1a-1)

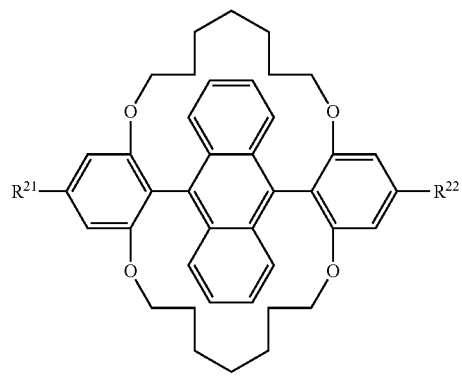 (1a-2)
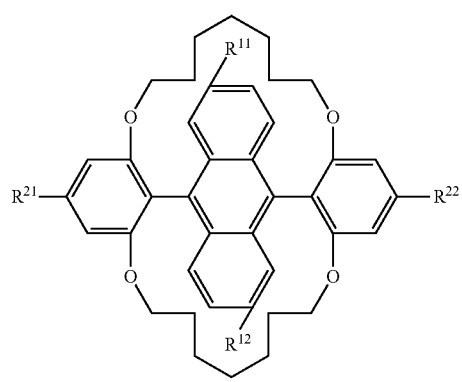 (1a-3)
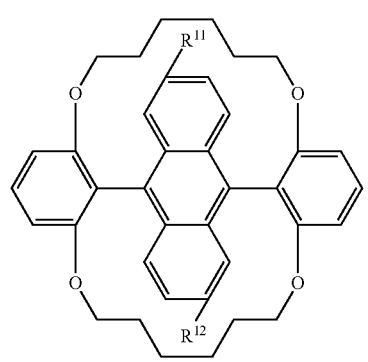 (1b-1)
(1b-2)
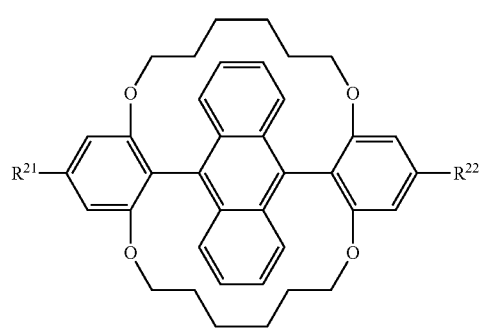
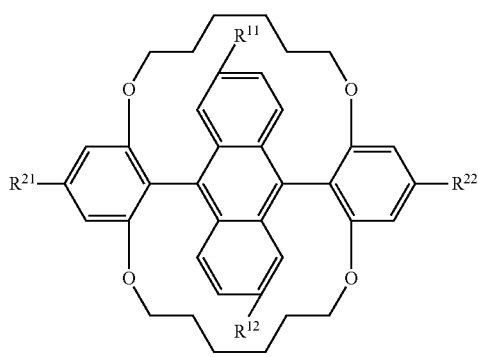 (1b-3)
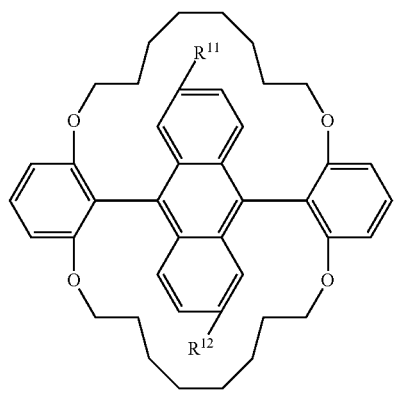 (1c-1)
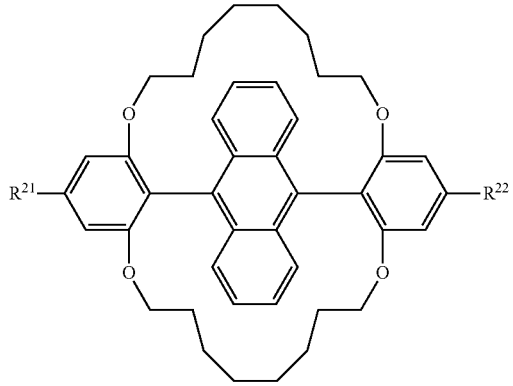 (1c-2)
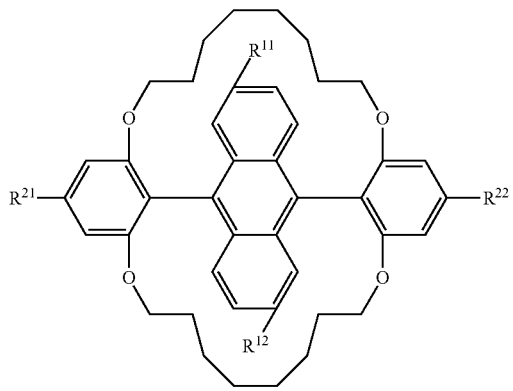 (1c-3)
In each of general formulas (1a-1) to (1a-3), (1b-1) to (1b-3), and (1c-1) to (1c-3), $R^{11}$ and $R^{12}$ each independently represent a hydrogen atom, an alkyl group, an alkoxy group, a phenyl group, a hydroxyl group, or an amino group. When each of $R^{11}$ and $R^{12}$ is an alkyl group or an alkoxy group, the carbon number is not particularly limited, but from the view point of facilitating interaction between molecules of the luminescent substance, the carbon number preferably includes about 1 to 10, and more preferably about 5 to 10. $R^{21}$ and $R^{22}$ each independently represents a hydrogen atom, an alkyl group, an alkoxy group, a phenyl group, a hydroxyl group, or an amino group. When each of $R^{21}$ and $R^{22}$ is an alkyl group or an alkoxy group, the carbon number is not particularly limited, but from the view point of facilitating interaction between molecules of the luminescent substance, the carbon number preferably includes about 1 to 10, and more preferably about 5 to 10.

Specific examples of the compound represented by general formula (1) include compounds represented by the following formulas (1a), (1b), and (1c):

A method of producing the compound represented by general formula (1) is not particularly limited, and the compound can be produced by a known synthesis method. The method of producing the compound represented by general formula (1) will be described using the compound represented by the above formula (1a) as an example. As shown in the following scheme 1, first, anthraquinone (1a1) and 2,6-dimethyloxyphenyl lithium are reacted to obtain a compound represented by formula (1a2). Next, the compound is dehydrated to obtain 9,10-bis(2,6-dimethoxyphenyl)anthracene (1a3). Dehydration can be conducted, for example, by heating to about 120° C. in the presence of NaI, $NaH_2PO_2 \cdot H_2O$, and AcOH. Next, 9,10-bis(2,6-dimethoxyphenyl)anthracene (1a3) is demethylated by using $BBr_3$ to obtain a compound represented by formula (1a4). Finally, the compound of formula (1a4) is reacted with 1,7-dibromoheptane to obtain the compound of formula (1a):

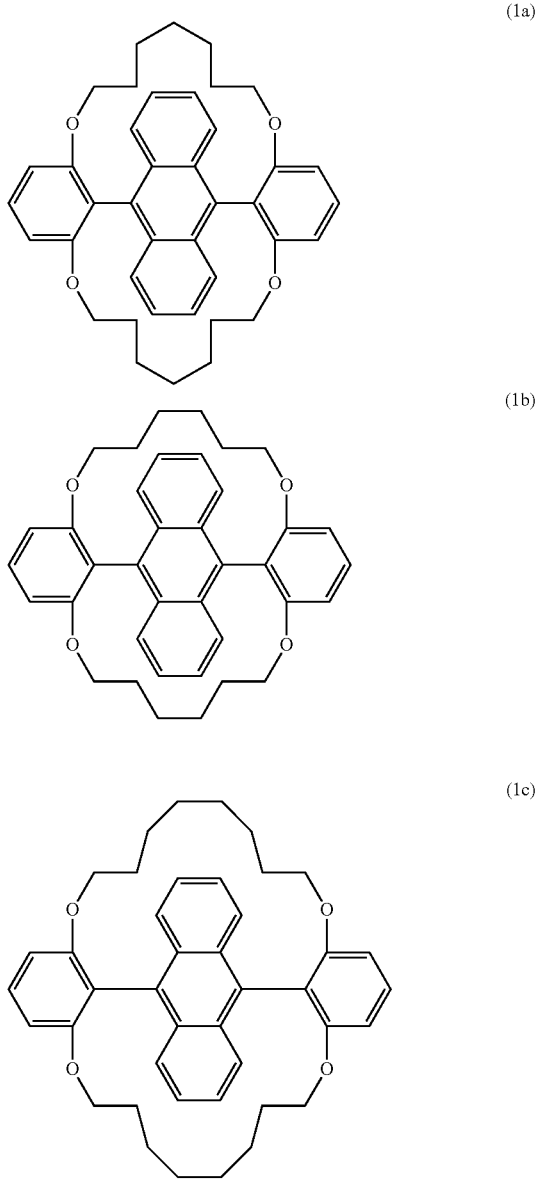

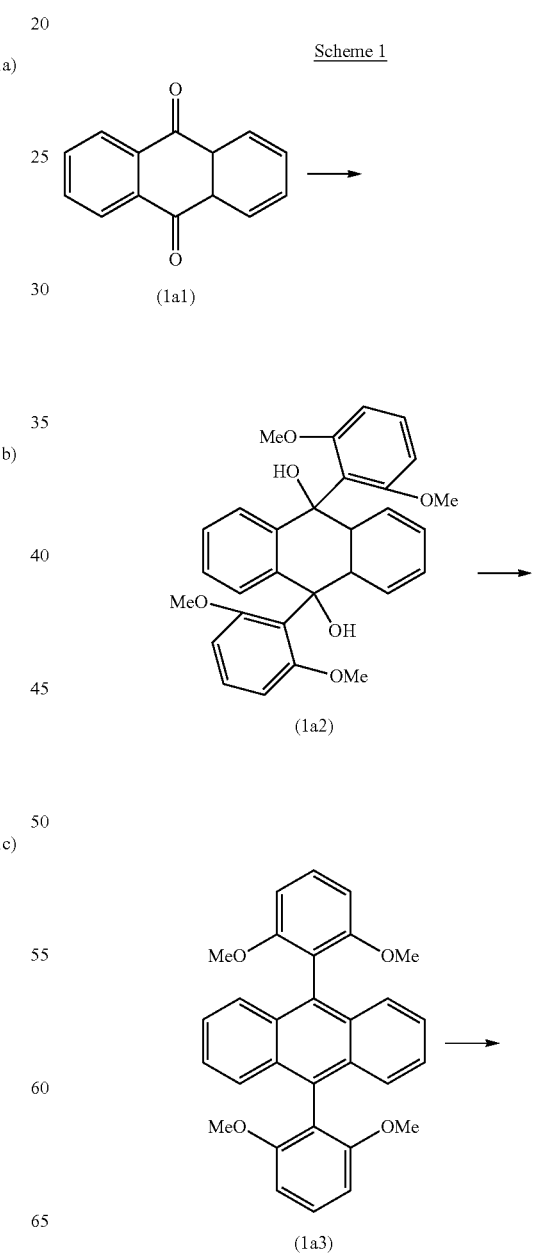

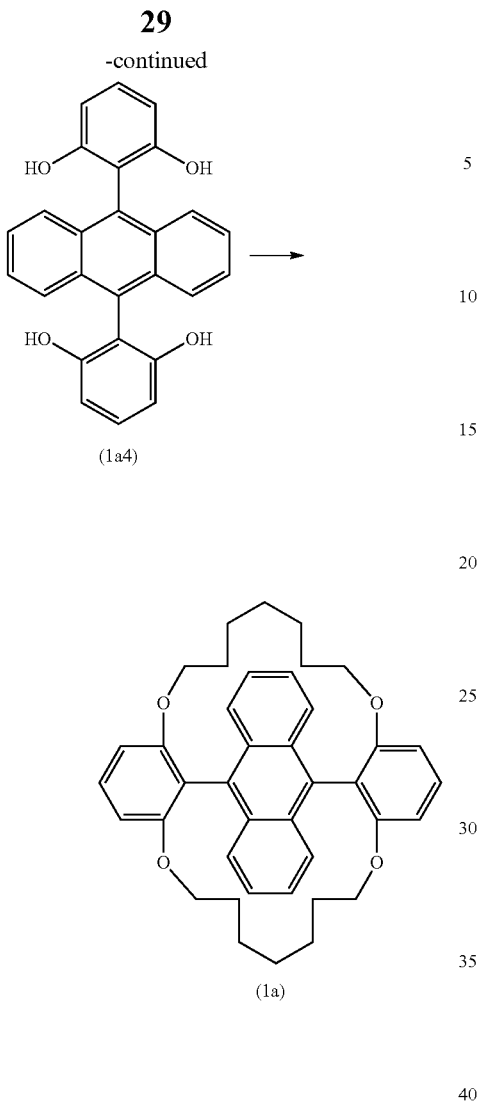

Moreover, the compound represented by general formula (1) can also be produced, for example by a method shown in the following scheme 2. The production method will be described using the compound represented by formula (1a) as an example. First, 9,10-dibromoanthracene (1a5) and 2,6-dimethoxyphenylboronic acid are bound to each other by Suzuki-Miyaura coupling reaction to obtain 9,10-bis(2,6-dimethoxyphenyl)anthracene (1a3). Subsequently, in the same manner as the above-described scheme 1, the compound of formula (1a) is obtained.

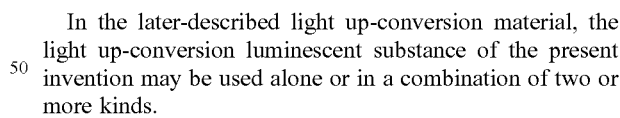

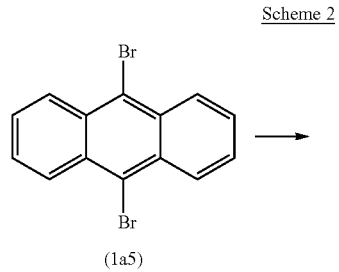

In the later-described light up-conversion material, the light up-conversion luminescent substance of the present invention may be used alone or in a combination of two or more kinds.

The light up-conversion material of the present invention contains a photosensitizer in addition to the compound (light up-conversion luminescent substance) represented by the above general formula (1). The photosensitizer is not particularly limited as far as it can absorb light energy and transfer the light energy to the light up-conversion luminescent substance of the present invention, and a known photosensitizer can be used.

From the view point of desirably transferring light energy to the light up-conversion luminescent substance of the present invention, an example of the photosensitizer preferably includes an organic metal complex. A metal constituting the organic metal complex is not particularly limited, but examples of the metal include Li, Mg, Al, Ti, V, Mn, Fe, Co, Ni, Cu, Zn, Ga, Ru, Pd, Ag, Re, Os, Ir, Pt, and Pb, and preferably include Pt, and Pd. Specific examples of the organic metal complex include a metal complex of porphyrin or its substitution product, and a metal complex of phthalocyanine or its substitution product, and among them preferably the metal complex of porphyrin or its substitution product.

Particularly preferred examples of the photosensitizer include a palladium complex of porphyrin or its substitution product, and a platinum complex of porphyrin or its substitution product. Specific examples of the palladium complex of porphyrin or its substitution product include palladium tetrabenzoporphyrin, palladium tetraphenyltetrabenzoporphyrin, palladium octaethylporphyrin, and palladium cyclohexenoporphyrin. Moreover, specific examples of the platinum complex of porphyrin or its substitution product include platinum tetrabenzoporphyrin, platinum tetraphenyltetrabenzoporphyrin, platinum octaethylporphyrin, and platinum cyclohexenoporphyrin.

In the light up-conversion material of the present invention, the photosensitizer may be used alone or in a combination of two or more kinds.

In the light up-conversion material of the present invention, the proportion (molar ratio) of the compound represented by general formula (1) and the photosensitizer to be incorporated is not particularly limited, but from the view point of effectively increasing the up-conversion luminescence quantum yield, the proportion of the compound represented by general formula (1) per mole of the photosensitizer is preferably about 10 to 10000 mol, and more preferably about 200 to 2000 mol.

In the light up-conversion material of the present invention, the total proportion of the compound represented by general formula (1) and the photosensitizer is not particularly limited, but from the view point of effectively increasing the up-conversion luminescence quantum yield, the total proportion may be preferably 60 mass % or more, and more preferably 90 mass % or more.

Moreover, the light up-conversion material of the present invention preferably contains a crystal formed by the compound represented by general formula (1) and the photosensitizer, from the view point of effectively increasing the up-conversion luminescence quantum yield. This is because such a crystallized portion has particularly high luminescence efficiency in the light up-conversion material of the present invention.

In the present invention, the up-conversion luminescence quantum yield ($\Phi uc$) is calculated according to the following mathematical expression (A):

$$\Phi uc = 2 \times \Phi std \times (Astd/Auc) \times (Iuc/Istd) \times (Nuc/Nstd)^2 \quad (A)$$

In the above formula, Astd and Auc denote absorbances at excitation wavelengths of a standard substance and a test sample, respectively. Moreover, Istd and Iuc denote integrated emission intensities obtained by integrating emission intensities of the standard substance and the test sample, respectively, by a wavelength over the entire region of the luminescent substance. In particular, as for the test sample for up-conversion, it is an integrated emission intensity regarding an up-conversion light emitting band having a wavelength shorter than that of the excited light. Moreover, Nstd and Nuc denote refractive indexes of solvents or surrounding media at emission wavelengths of the standard substance and the test sample.

As the standard substance, any standard substance can be used that can be excited at the same wavelength and in the same optical arrangement as those of the test sample, and of which reliable fluorescence quantum yield has been reported. For example, in the Examples given below, an ethylene glycol solution (100 μM) of rhodamine 101 was used as the standard substance, and its fluorescence quantum yield, 0.94, was used as $\Phi std$. This value of fluorescence quantum yield is a value determined by using a dilute solution of rhodamine 101 in ethanol as the standard substance and the fluorescent quantum yield of 0.89 reported in the article "C. Wurth, C. Lochmann, M. Spieles, J. Pauli, K. Hoffmann, T. Schuttrigkeit, T. Franzl, and U. Resch-Genger, "Evaluation of a Commercial Integration Sphere Setup for the Determination of Absolute Photoluminescence Quantum Yields of Dilute Dye Solutions, " Appl. Spectroscop. 2010, Vol. 64, Issue 7, pp. 733 to 741" for the same diluted solution as $\Phi std$ in the following mathematical expression (B):

$$\Phi fl = \Phi std \times (Astd/Auc) \times (Iuc/Istd) \times (Nuc/Nstd)^2 \quad (B)$$

The value of fluorescence quantum yield also fell within an error of 3% of the value obtained by directly measuring an ethylene glycol solution (100 μM) of rhodamine 101, in accordance with the method described in the article "K. Suzuki, A. Kobayashi, S. Kaneko, K. Takehira, T. Yoshihara, H. Ishida, Y. Shiina, S. Oishi, and S. Tobita, "Reevaluation of absolute luminescence quantum yields of standard solutions using a spectrometer with an integrating sphere and a back-thinned CCD detector," Phys. Chem. Chem. Phys. 2009, 11, pp. 9850 to 9860".

The temperature at which the light up-conversion material of the present invention is solid is not particularly limited as long as it is solid during use, and the light up-conversion material is solid at least at 125° C. or lower, and preferably at 80° C. or lower.

The light up-conversion material of the present invention can be produced using a method including the step of drying a solution containing the compound represented by the general formula (1) above and a photosensitizer, although the method is not particularly limited thereto. By adopting this production method, a light up-conversion material having particularly improved luminescence efficiency can be obtained.

Specifically, a solution is prepared that contains a photosensitizer, and has a high concentration of the compound (luminescent substance) represented by general formula (1), which is specifically one-tenth or more of the saturation concentration, and wherein the proportion of molecules of the luminescent substance per mole of the sensitizer is 100 mol or more, and preferably 500 mol or more. By rapidly evaporating the solvent from the solution, a light up-conversion material in solid form can be rapidly produced. In an exemplary method of rapidly evaporating the solvent, a highly volatile polar solvent such as tetrahydrofuran may be used, and dried by being dropped onto the surface of a glass substrate having good wettability. When the light up-conversion material is produced in this manner, it can be rapidly transferred into a solid form, with a high degree of mutual dispersion between the luminescent substance and the photosensitizer. It is believed that this suppresses the aggregation of molecules of the luminescent substance or molecules of the photosensitizer during the transition from a liquid to a solid, which allows adjacent molecules of the luminescent substance and the photosensitizer to be dispersed in the solid. It is believed that this causes efficient triplet energy transfer from the photosensitizer to the adjacent luminescent substance in the solid, resulting in a high up-conversion luminescence quantum yield. Note that in Patent Document 2, a solution in which a photosensitizer and the compound (luminescent substance) represented by general formula (1) are dissolved in a solvent is prepared; however, this solution is used as the light up-conversion material without drying the solvent. Patent Document 2 assumes the solution to be the material system that realizes the highest up-conversion efficiency, and, as shown in Non-Patent Document 3, it was known that evaporation from the solution does not lead to up-conversion because the sensitizer and the luminescent substance are separately crystallized.

The solvent is not particularly limited, and an organic solvent, water, and so on can be used, for example. Specific examples of the organic solvent include nitrile solvents such as acetonitrile and benzonitrile; halogen solvents such as chloroform, dichloromethane, 1,2-dichloroethane, 1,1,2-trichloroethane, chlorobenzene, and o-dichlorobenzene; ether solvents such as tetrahydrofuran and dioxane; aromatic hydrocarbon solvents such as benzene, toluene and xylene; aliphatic hydrocarbon solvents such as cyclohexane, methylcyclohexane, n-pentane, n-hexane, n-heptane, n-octane, n-nonane, and n-decane; ketone solvents such as acetone, methyl ethyl ketone, and cylohexanone; ester solvents such as ethyl acetate, butyl acetate, and ethyl cellosolve acetate; polyols such as ethylene glycol, ethylene glycol monobutyl ether, ethylene glycol monoethyl ether, ethylene glycol monomethyl ether, dimethoxy ethane, propylene glycol, diethoxy methane, triethylene glycol monoethyl ether, glycerin, and 1,2-hexanediol, and derivatives thereof; alcoholic solvents such as methanol, ethanol, propanol, isopropanol, and cyclohexanol; sulfoxide solvents such as dimethyl sulfoxide; and amide solvents such as N-methyl-2-pyrrolidone and N,N-dimethylformamide. Among the above, preferred examples include diacetone, tetrahydrofuran, chloroform, dichloromethane, and cyclohexane, which have high volatility, although the solvent is not limited thereto, and may vary depending on the evaporation conditions. The solution may be dried using, for example, an ink-jet method or a spray-dry method.

The light up-conversion material of the present invention may be incorporated into a resin or glass. The resin is not particularly limited, and can be selected appropriately according to the application. For example, known resins such as a (meth)acryl resin, a polyester resin, a polyurethane resin, an epoxy resin, a polyolefin resin, a polyamide resin, a polystyrene resin, a cellulose resin, an imide resin, a polyvinyl chloride resin, a fluoric resin, a silicone resin, a polycarbonate resin, a polysulfone resin, a cyclic polyolefin resin, a polylactic acid resin, and a vinyl ester resin can be used. Moreover, the shape of the resin is not particularly limited, and can be selected appropriately, for example according to the application. Examples of the shape include a film-like shape, a sheet-like shape, and a fibrous shape.

The glass is not particularly limited, and can be selected appropriately according to the application. For example, quartz glass, borosilicate glass, soda glass, alumina silicate glass, soda lime glass, alkali-free glass and the like can be used. Moreover, the shape of the glass is not particularly limited, and can be selected appropriately, for example according to the application. Examples of the shape include a film-like shape, a sheet-like shape, and a fibrous shape.

The light up-conversion material of the present invention has absorption intensity peaks at positions where the wavelength of absorbed light is typically from about 480 to 560 nm, and preferably from about 490 to 510 nm and from about 525 to 540 nm. The light up-conversion material of the present invention has an emission intensity peak at a position where the wavelength of emitted light is typically from about 400 to 550 nm, and preferably from about 400 to 480 nm. Moreover, light irradiation power (mW) of light with which the light up-conversion material of the present invention is irradiated can be selected appropriately according to application of the light up-conversion material, and an example of the light irradiation power includes about 0.01 to 10 mW.

Since the light up-conversion material of the present invention can efficiently convert a wavelength incident to the light up-conversion material into a short wavelength, the light up-conversion material of the present invention can be used desirably for application including solar cells such as organic solar cells, natural light illumination, LEDs, organic EL devices, biomarkers, displays, printing, security recognition, optical data storage units, and sensors. The light up-conversion material of the present invention can be used desirably as a method of converting a light wavelength, which includes irradiating the light up-conversion material with light to cause emission of light having a wavelength shorter than that of the radiated light.

EXAMPLES

Hereinafter, the present invention will be described in detail by way of examples and comparative examples. However, the present invention is not limited to these examples.

Example 1

Pt-octaethylporphyrin (PtOEP) represented by formula (4) shown below was added as a photosensitizer into a medium of tetrahydrofuran (THF) to prepare a solution having a predetermined concentration. Next, powder of a compound (C7-sDPA) represented by formula (1a) shown below was added as a luminescent substance into this solution of PtOEP having a predetermined concentration, and stirred homogeneously to obtain a solution. Here, the molar ratio between the luminescent substance and the photosensitizer was 720 mol of the luminescent substance per mole of the photosensitizer, and the concentration of C7-sDPA was the saturated concentration at room temperature (23° C.). Next, the obtained solution was taken into a pipette, one drop of the solution was dropped onto the surface of a slide glass, and the solution was allowed to dry at room temperature (23° C.) for 1 minute in the air, thus obtaining a solid sample spread in circular form (see FIG. 1). Note that the diameter of the portion spread in circular form was about 2 cm. The total proportion of the compound represented by general formula (1a) and the photosensitizer in the solid sample was 100 mass %.

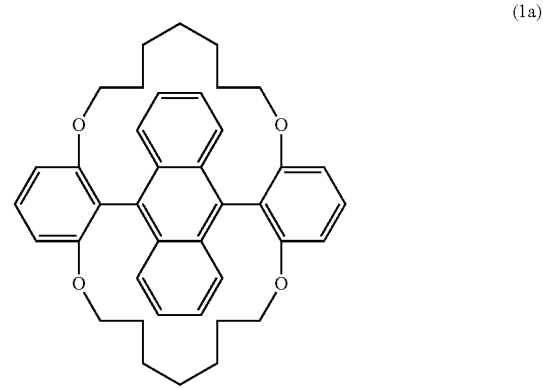

(1a)

-continued (4)

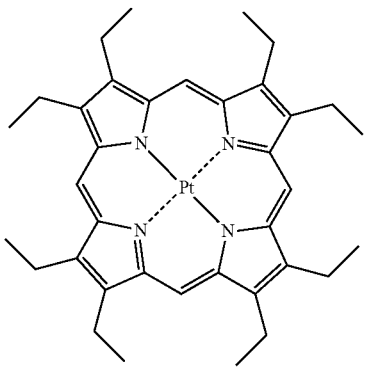

Next, the obtained solid sample was irradiated with a laser beam having an optical output power of 4 mW (central wavelength of the incident light: 532 nm, green, continuous light), and having its beam diameter enlarged with a convex lens, to cause the solid spread in circular form to be excited, and the solid sample was visually observed through a notch filter for preventing scattering of the radiated light. As a result, the circumferential portion of the solid spread in circular form emitted blue light (the photograph shown in FIG. 1 was taken under such conditions). The laser beam diameter at the irradiated site was over 2 cm, the laser beam used had a Gaussian spatial profile having a high light intensity at the center, and the intensity of the radiated light in the circumferential portion emitting blue light was less than 2.3 mW/cm$^2$.

Example 2

Figure 2:
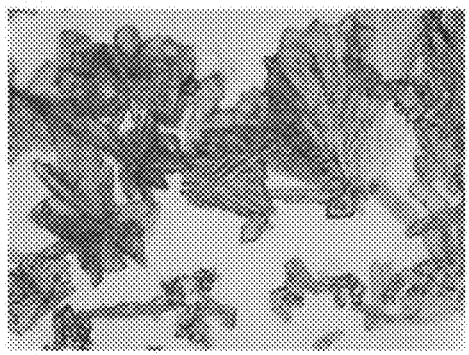
FIG. 2 is a microscopic image of crystal grains (the molar ratio of PtOEP:C7-sDPA is 1:720) contained in the solid sample obtained in Example 2.
Figure 3:
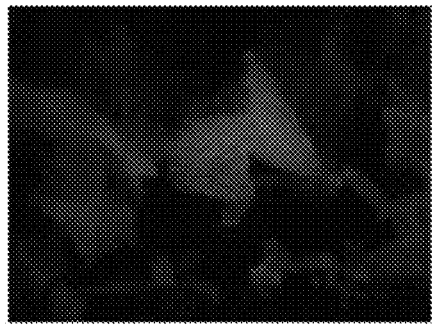
FIG. 3 is a photograph of an emission from a crystal grain obtained in Example 2, observed with a CCD camera through a notch filter.
Figure 4:
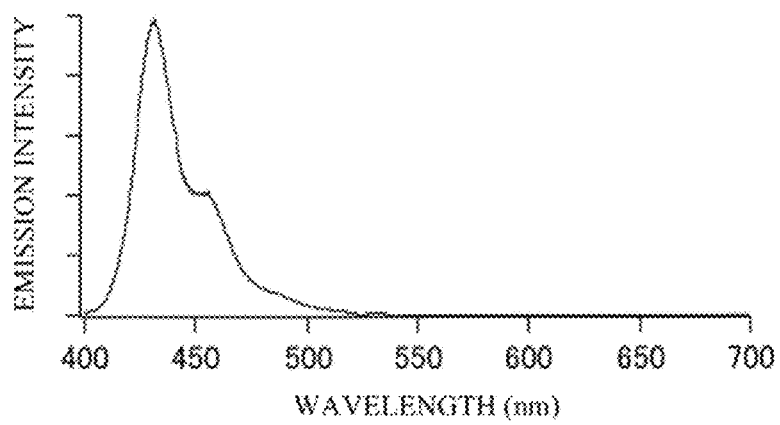
FIG. 4 is an emission spectrum of the solid sample (crystalline solid in the middle of FIG. 3) obtained in Example 2.

A solid sample spread in circular form, composed of Pt-octaethylporphyrin (PtOEP, formula (4)) and the compound (C7-sDPA) represented by formula (1a), prepared as in Example 1, was observed under an optical microscope (objective lens, 20 times). As a result, the solid sample was shown to be composed of granular crystals having various shapes (FIG. 2). Moreover, a green laser beam (continuous light) with a wavelength of 532 nm was directed through the same objective lens to a crystal grain of the solid sample present at the center of the field of view of the microscope observation (light intensity at the irradiated site: 6.0 W/cm$^2$). In this state, the emission from the solid sample was observed with a CCD camera through a notch filter, and the emission spectrum was observed with a fiber spectroscope. As a result, the crystal grain was confirmed to be emitting vivid blue light (FIG. 3). The obtained spectrum is shown in FIG. 4. The total proportion of the compound represented by general formula (1a) and the photosensitizer in the solid sample was 100 mass %.

Example 3

A sample was prepared in which the region of the solid sample spread in circular form, composed of Pt-octaethylporphyrin (PtOEP) and the compound (C7-sDPA) represented by formula (1a), prepared as in Example 1, was covered with a cover glass with a 80-μm spacer therebetween (sample 3-air). The total proportion of the compound represented by general formula (1a) and the photosensitizer in the solid sample was 100 mass %.

A sample was also prepared in the same manner as described above, except that only the step of covering the solid sample with a cover glass was performed in a high-purity argon (99.998% or higher) atmosphere, and the periphery of the cover glass was sealed with an ultraviolet curing resin (the solid sample was masked during sealing to avoid ultraviolet radiation) to place the solid sample in an argon gas environment (sample 3-Ar).

Additionally, a sample was prepared which was identical to sample 3-air, except that in the step of placing a cover glass, the solid sample was covered with a drop of an immersion oil (Olympus Corporation, refractive index 1.404) before being covered with a cover glass, and the cover glass was placed thereon (sample 3-oil).

The three types of samples prepared by the above-described procedures were observed sequentially under an optical microscope (objective lens, 20 times), and for selected crystal grains, transmission absorption spectra were measured directly with the same objective lens, using a fiber spectroscope connected to the microscope, and emission spectra were measured by directing a green laser beam with a wavelength of 532 nm (continuous light; light intensity at the irradiated site: 6.0 W/cm$^2$), and measuring through a notch filter. Additionally, reference samples were prepared using the same spacer, slide glass, and cover glass as those used for each of the above-described three samples, by loading an ethylene glycol solution (100 μM) of rhodamine 101 between glass sheets, and transmission absorption spectra and emission spectra were measured under the same conditions as those used for the above-described three samples. From these data, the luminescence quantum yield of crystal grains of each of the samples was determined based on mathematical expression (A) shown above. Although the obtained luminescence quantum yield varied for each crystal grain, the average value and the standard deviation for 10 crystal grains for each sample are shown in Table 1.

As shown in Table 1, the up-conversion luminescence quantum yield is over 10% for all the samples. At present, no solid light up-conversion material utilizing triplet-triplet annihilation has been reported to have a luminescence quantum yield over 10%. Although the sample 3-Ar has the highest average value of the three samples, there is no significant difference between the sample 3-Ar and the sample 3-oil in consideration of their standard deviations. The immersion oil serves to promote refractive index matching with a solid crystal surface to reduce losses due to scattering or reflection at the solid sample. In contrast, in the sample 3-Ar, the solid sample was surrounded by air, and refractive index matching was not sufficiently achieved. However, because there is no significant difference between these samples, it is concluded that the error due to the insufficient refractive index matching is smaller than the individual difference between the crystal grains. Moreover, the sample 3-air, of which surrounding environment was air, can be said to have no substantial difference from the other two samples, in consideration of the error. While it is known that liquid light up-conversion materials undergo a significant decrease in up-conversion luminescence quantum yield in the presence of oxygen, the foregoing results show that the solid samples according to the present examples are not significantly affected by the air.

Note that the up-conversion luminescence quantum efficiencies of the solid light up-conversion materials obtained in the present examples were higher than that (a maximum of 15.1%) of the dimethylsulfoxide solution containing Pt-octaethylporphyrin (PtOEP, formula (4)) and the compound (C7-sDPA) represented by formula (1a) disclosed in Patent Document 2, although they were measured under different conditions.

TABLE 1

| Example 3 | Average | Standard Deviation |
| --- | --- | --- |
| Sample 3-air | 0.15 | 0.05 |
| Sample 3-Ar | 0.23 | 0.03 |
| Sample 3-oil | 0.17 | 0.06 |

Comparative Example 1

Three types of samples (sample 4-air, sample 4-Ar, and sample 4-oil in which the surrounding environment of each of the solid samples was air, argon gas, or the immersion oil, respectively) were prepared as in Example 3, except that the compound (DPA) represented by the following formula was used as the luminescent substance instead of the compound (C7-sDPA) represented by formula (1a), and the molar ratio of the luminescent substance to the photosensitizer was 1000 mol of the luminescent substance per mole of the photosensitizer, and the up-conversion luminescence quantum yield was measured using the same procedures and method as those in Example 3. As a result, the average value and standard deviation of the up-conversion luminescence quantum yield for 10 crystal grains for each sample were obtained, as shown in Table 2. The samples of these comparative examples are clearly inferior to those of Example 3.

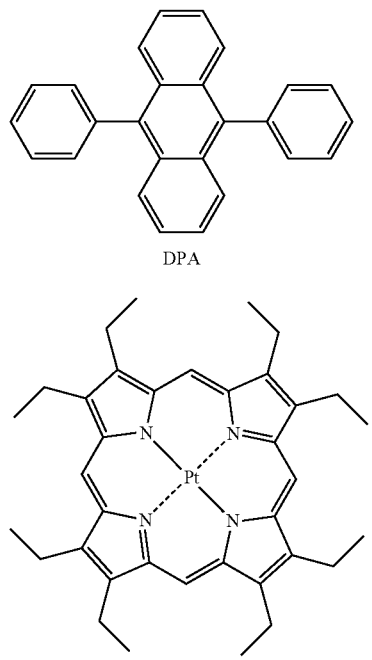

DPA (4)

TABLE 2

| Comparative Example 1 | Average | Standard Deviation |
| --- | --- | --- |
| Sample 4-air | 0.010 | 0.006 |
| Sample 4-Ar | 0.022 | 0.014 |
| Sample 4-oil | 0.011 | 0.004 |

Example 4

Figure 5:
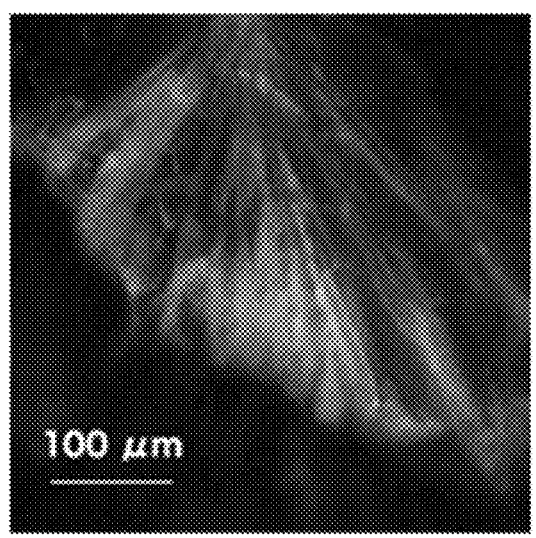
FIG. 5 is a photograph of an emission from a crystal grain obtained in Example 4, observed with a CCD camera through a notch filter.
Figure 6:
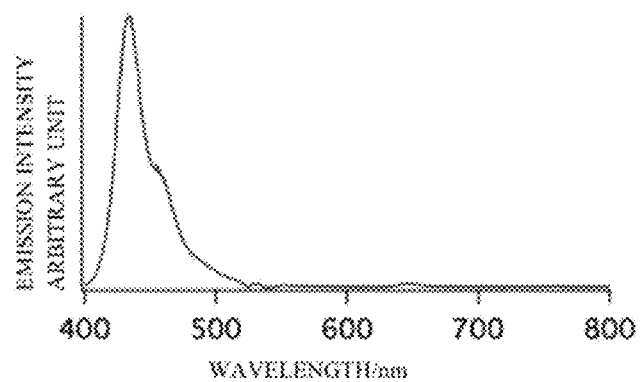
FIG. 6 is an emission spectrum of the solid sample (crystalline solid in the middle of FIG. 5) obtained in Example 4.

A solid sample spread in circular form was obtained as in Example 3, using the same method as that of Example 1, except that 2,6-dioctyl-C7s-DPA represented by the following formula (compound corresponding to general formula (1a-1)) was used as the luminescent substance instead of the compound (C7-sDPA) represented by formula (1a), and the molar ratio of the luminescent substance to the photosensitizer was 1000 mol of the luminescent substance per mole of the photosensitizer. Next, an emission from the solid sample was observed as in Example 2, except that the intensity of the excited light at the irradiated site was 3.0 W/cm², and the emission spectrum was measured. As a result, the crystal grain was confirmed to be emitting vivid blue light (FIG. 5). The obtained spectrum is shown in FIG. 6. Note that the compound of the following formula was synthesized in accordance with the method described in paragraph [0036] of WO 2014/136619 A1, using 2,6-dibromoanthraquinone instead of anthraquinone. Moreover, only for a sample prepared by performing the step of covering the solid sample with a cover glass in the air, the luminescence quantum yield was measured as in Example 3. As a result, although the luminescence quantum yield varied for each crystal grain, the average value and standard deviation for 8 crystal grains of the sample were 0.20 and 0.06, respectively. The up-conversion luminescence quantum yield of the solid light up-conversion material obtained in Example 4 was higher than that of the sample of Comparative Example 1. The total proportion of the compound represented by the following formula and the photosensitizer in the solid sample was 100 mass %.

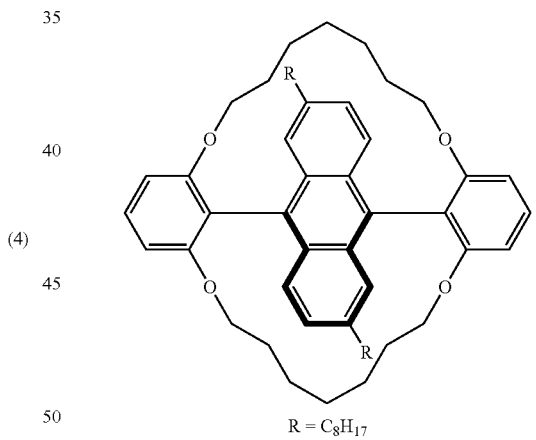

$R = C_8H_{17}$

Example 5

Figure 7:
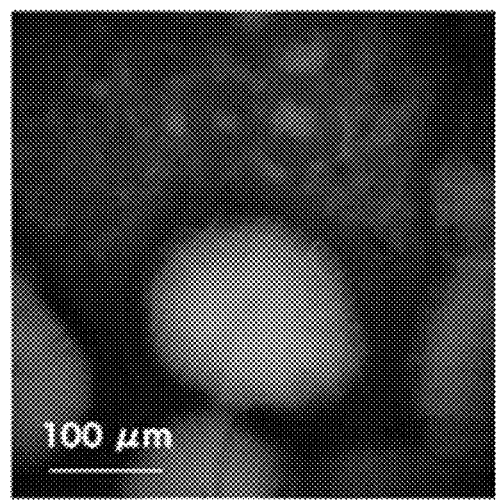
FIG. 7 is a photograph of an emission from a crystal grain obtained in Example 5, observed with a CCD camera through a notch filter.
Figure 8:
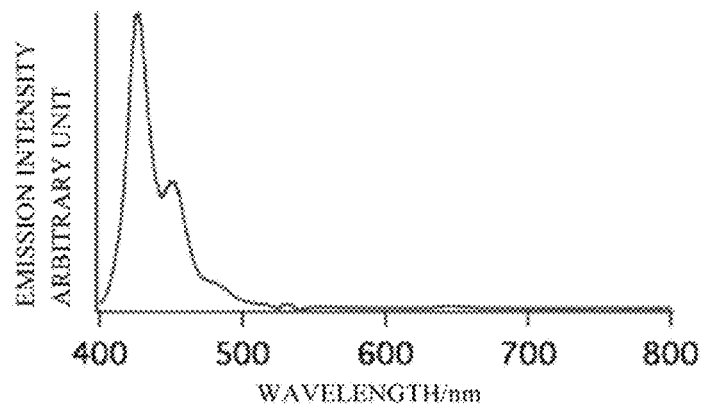
FIG. 8 is an emission spectrum of the solid sample (crystalline solid in the middle of FIG. 7) obtained in Example 5.

A solid sample spread in circular form was obtained as in Example 3, using the same method as that of Example 1, except that C7s-bis(4-octylphenyl)anthracene represented by the following formula (corresponding to the compound of general formula 1a-2) was used as the luminescent substance instead of the compound (C7-sDPA) represented by formula (1a), and the molar ratio of the luminescent substance to the photosensitizer was 1000 mol of the luminescent substance per mole of the photosensitizer. Next, an emission was observed as in Example 2, except that the light intensity at the irradiated site was 6.0 W/cm², and the emission spectrum was measured. As a result, the crystal grain was confirmed to be emitting vivid blue light (FIG. 7). The obtained spectrum is shown in FIG. 8. Note that the compound of the following formula was synthesized in accordance with the method described in paragraph [0036] of WO 2014/136619 A1, using 2,6-dimethoxy-4-octylphenyllithium instead of 2,6-dimethoxyphenyllithium. Moreover, only for a sample prepared by performing the step of covering the solid sample with a cover glass in the air, the luminescence quantum yield was measured as in Example 3. As a result, although the luminescence quantum yield varied for each crystal grain, the average value and standard deviation for 9 crystal grains of the sample were 0.059 and 0.004, respectively. The up-conversion luminescence quantum yield of the solid light up-conversion material obtained in Example 5 was higher than that of the sample of Comparative Example 1. The total proportion of the compound represented by the following formula and the photosensitizer in the solid sample was 100 mass %.

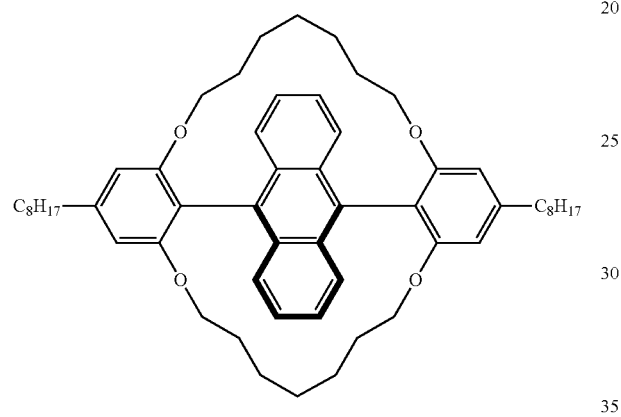

The invention claimed is:

1. A light up-conversion material comprising a compound represented by the following general formula (1) and a photosensitizer, the light up-conversion material being a solid:

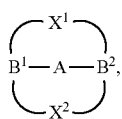
(1)

wherein Group A in Formula (1) represents any one of polycyclic aromatic compound moieties represented by the following Formulas: A1-1), (A1-2), (A2-1), (A3-1), (A4-1), (A5-1), (A5-2), (A6-1), (A9-1), (A9-2), (A9-3), (A9-4), (A14-1), (A14-2), (A14-3) and (A14-4), where

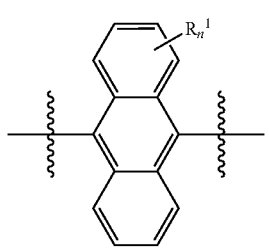
(A1-1)

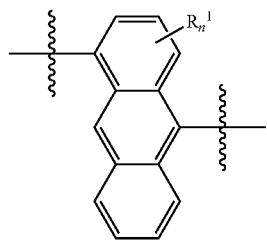
(A1-2)

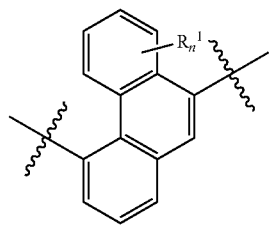
(A2-1)

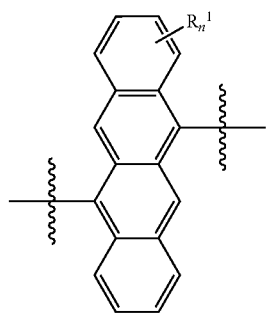
(A3-1)

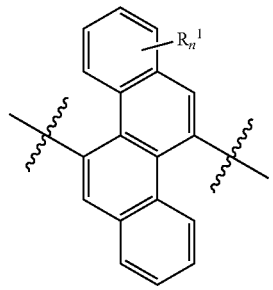
(A4-1)

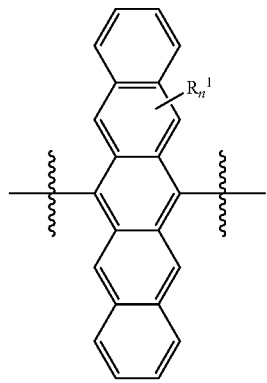
(A5-1)

-continued
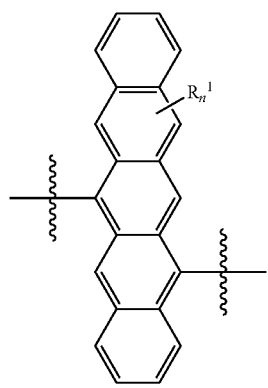
(A5-2)
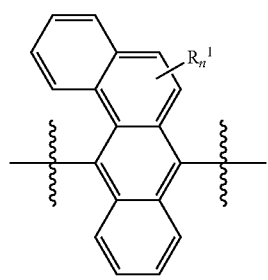
(A6-1)
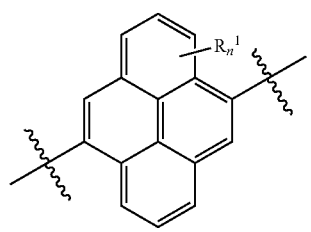
(A9-1)
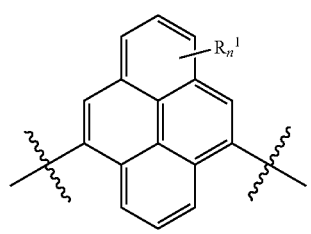
(A9-2)
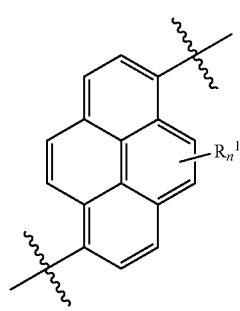
(A9-3)
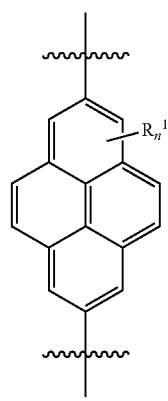
(A9-4)
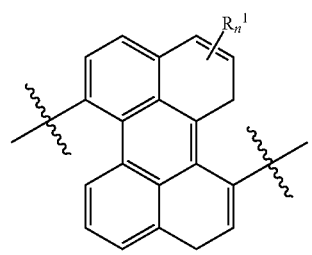
(A14-1)
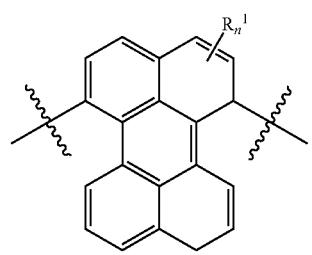
(A14-2)
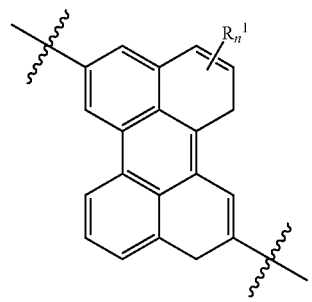
(A14-3)
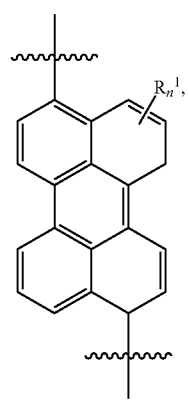
(A14-4)

wherein in each of Formulas (A1-1), (A1-2), (A2-1), (A3-1), (A4-1), (A5-1), (A5-2), (A6-1), (A9-1), (A9-2), (A9-3), (A9-4), (A14-1) (A14-2) (A14-3 and (A14-4), $R_n^1$ is 0 or more substituents each of which substitutes for a hydrogen atom bound to an aromatic ring and each independently represents an alkyl group, an alkoxy group, a phenyl group, a hydroxyl group or an amino group, wherein Group $B^1$ and Group $B^2$ each independently represent a trivalent group represented by the following Formula (2a):

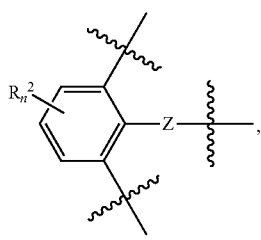

(2a)

wherein in each of Formulas (2a), Group Z binds to Group A, the remaining two binding hands respectively bind to Group $X^1$ and Group $X^2$, and Group Z represents a single bond, $R_n^2$ is 0 to 3 substituents which substitute for a hydrogen atom on a benzene ring, and each independently represent an alkyl group, an alkoxy group, a phenyl group, a hydroxyl group or an amino group, wherein Group $X^1$ and Group $X^2$ each independently represent a straight-chain or branched-chain alkylene group with a carbon number of 5 to 10 having an ether bond, and wherein a total proportion of the compound represented by Formula (1) and the photosensitizer in the solid is 60 mass % or more.

2. The light up-conversion material according to claim 1, comprising a crystal composed of the compound represented by Formula (1) and the photosensitizer.

3. A method of converting a light wavelength comprising:
irradiating the light up-conversion material according to claim 1 with light to cause emission of light having a wavelength shorter than a wavelength of radiated light.

4. A method of producing a light up-conversion material comprising the step of drying a solution comprising a compound represented by the following Formula (1) and a photosensitizer:

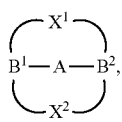

(1)

wherein Group A in Formula (1) represents any one of polycyclic aromatic compound moieties represented by the following Formulas: (A1-1), (A1-2), (A2-1), (A3-1), (A4-1), (A5-1), (A5-2), (A6-1), (A9-1), (A9-2), (A9-3), (A9-4), (A14-1), (A14-2), (A14-3) and (A14-4) where

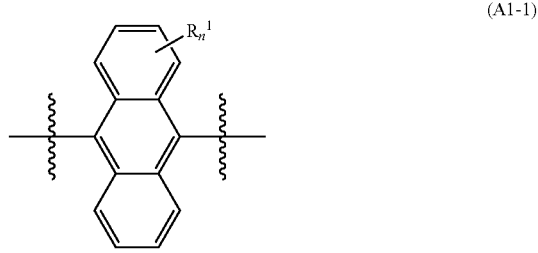

(A1-1)

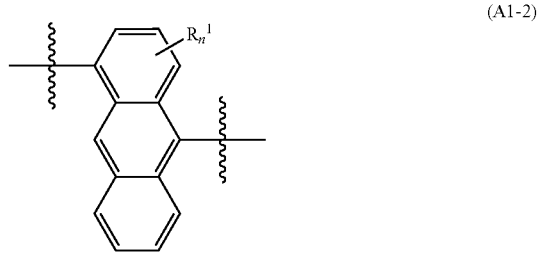

(A1-2)

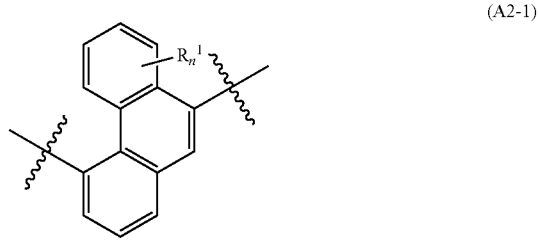

(A2-1)

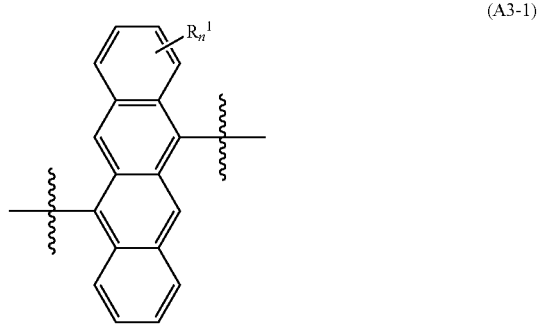

(A3-1)

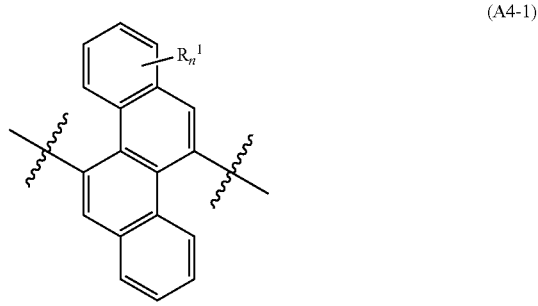

(A4-1)

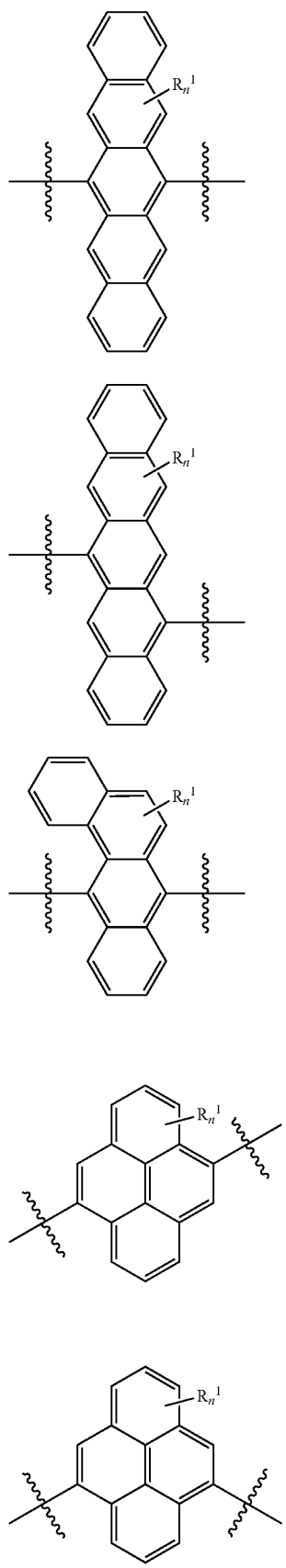
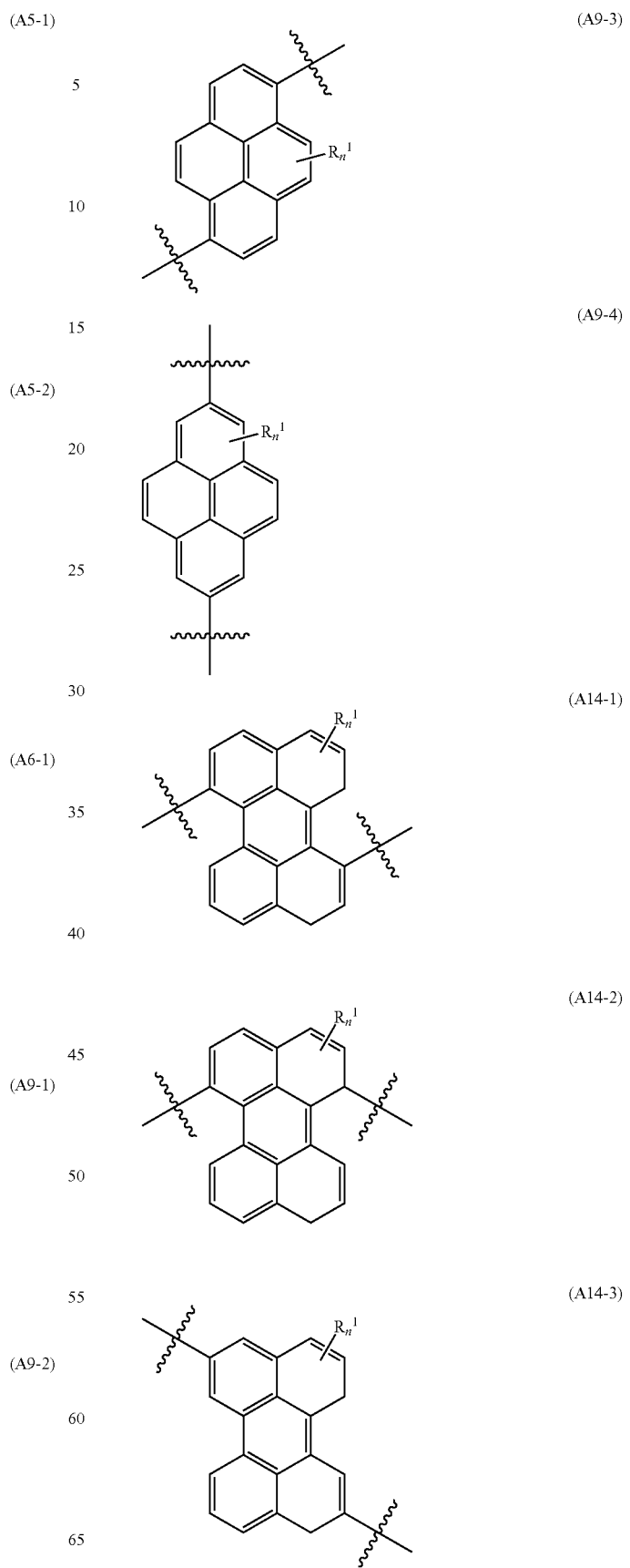

(A14-4)

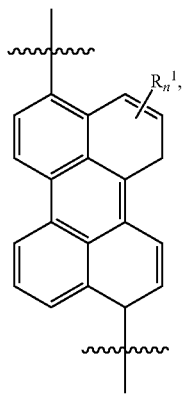

wherein in each of Formulas (A1-1), (A1-2), (A2-1), (A3-1), (A4-1), (A5-1), (A5-2), (A6-1), (A9-1), (A9-2), (A9-3), (A9-4), (A14-1), (A14-2), (A14-3) and (A14-4), $R_n^1$ is 0 or more substituents each of which substitutes for a hydrogen atom bound to an aromatic ring and each independently represents an alkyl group, an alkoxy group, a phenyl group, a hydroxyl group or an amino group, wherein Group $B^1$ and group $B^2$ each independently represent a trivalent group represented by the following Formula (2a):

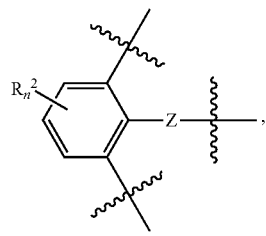

(2a)

wherein in each of Formulas (2a), Group Z binds to Group A, remaining two binding hands respectively bind to Group $X^1$ and Group $X^2$, and group Z represents a single bond, $R_n^2$ is 0 to 3 substituents which substitute for a hydrogen atom on a benzene ring, and each independently represent an alkyl group, an alkoxy group, a phenyl group, a hydroxyl group or an amino group, wherein Group $X^1$ and Group $X^2$ each independently represent a straight-chain or branched-chain alkylene group with a carbon number of 5 to 10 having an ether bond, and wherein a total proportion of the compound represented by Formula (1) and the photosensitizer in the solid is 60 mass % or more.

* * * * *